US011593948B2

(12) United States Patent
Yu et al.

(10) Patent No.: US 11,593,948 B2
(45) Date of Patent: Feb. 28, 2023

(54) GENERATING REFINED ALPHA MATTES UTILIZING GUIDANCE MASKS AND A PROGRESSIVE REFINEMENT NETWORK

(71) Applicant: Adobe Inc., San Jose, CA (US)

(72) Inventors: Qihang Yu, Baltimore, MD (US); Jianming Zhang, Campbell, CA (US); He Zhang, San Jose, CA (US); Yilin Wang, San Jose, CA (US); Zhe Lin, Fremont, CA (US); Ning Xu, Milpitas, CA (US)

(73) Assignee: Adobe Inc., San Jose, CA (US)

(*) Notice: Subject to any disclaimer, the term of this patent is extended or adjusted under 35 U.S.C. 154(b) by 101 days.

(21) Appl. No.: 17/177,595

(22) Filed: Feb. 17, 2021

(65) Prior Publication Data

US 2022/0262009 A1 Aug. 18, 2022

(51) Int. Cl.
*G06T 7/00* (2017.01)
*G06T 7/194* (2017.01)
(Continued)

(52) U.S. Cl.
CPC ............ *G06T 7/194* (2017.01); *G06T 3/4046* (2013.01); *G06T 3/4053* (2013.01); *G06T 5/009* (2013.01);
(Continued)

(58) Field of Classification Search
CPC ......... G06T 7/194; G06T 7/11; G06T 2207/20081; G06T 2207/20084;
(Continued)

(56) References Cited

U.S. PATENT DOCUMENTS 8,175,384 B1 * 5/2012 Wang ...................... G06T 7/194
382/199
8,391,594 B1 * 3/2013 Wang ................... G06V 10/267
382/199
(Continued)

OTHER PUBLICATIONS

Yagiz Aksoy, Tae-Hyun Oh, Sylvain Paris, Marc Pollefeys, and Wojciech Matusik. Semantic soft segmentation. ACM Transactions on Graphics (TOG), 37(4):1-13, 2018.
(Continued)

*Primary Examiner* — Li Liu
(74) *Attorney, Agent, or Firm* — Keller Preece PLLC

(57) ABSTRACT

The present disclosure relates to systems, non-transitory computer-readable media, and methods that utilize a progressive refinement network to refine alpha mattes generated utilizing a mask-guided matting neural network. In particular, the disclosed systems can use the matting neural network to process a digital image and a coarse guidance mask to generate alpha mattes at discrete neural network layers. In turn, the disclosed systems can use the progressive refinement network to combine alpha mattes and refine areas of uncertainty. For example, the progressive refinement network can combine a core alpha matte corresponding to more certain core regions of a first alpha matte and a boundary alpha matte corresponding to uncertain boundary regions of a second, higher resolution alpha matte. Based on the combination of the core alpha matte and the boundary alpha matte, the disclosed systems can generate a final alpha matte for use in image matting processes.

20 Claims, 9 Drawing Sheets

(51) Int. Cl.
G06T 7/136 (2017.01)
G06T 7/11 (2017.01)
G06T 3/40 (2006.01)
G06T 5/00 (2006.01)

(52) U.S. Cl.
CPC ............... *G06T 7/11* (2017.01); *G06T 7/136* (2017.01); *G06T 2207/20081* (2013.01); *G06T 2207/20084* (2013.01)

(58) Field of Classification Search
CPC ............ G06T 2207/20016; G06N 3/08; G06N 20/00; G06N 3/04
See application file for complete search history.

(56) References Cited

U.S. PATENT DOCUMENTS

| | | | |
|---|---|---|---|
| 10,255,681 B2 | 4/2019 | Price et al. | |
| 2014/0003719 A1* | 1/2014 | Bai | G06T 7/269 382/173 |
| 2019/0130229 A1 | 5/2019 | Lu et al. | |
| 2019/0340462 A1 | 11/2019 | Pao et al. | |
| 2020/0311946 A1* | 10/2020 | Price | G06T 7/90 |
| 2020/0357142 A1* | 11/2020 | Aydin | G06N 20/00 |
| 2021/0319564 A1* | 10/2021 | Xu | G06N 3/08 |

OTHER PUBLICATIONS

Shaofan Cai, Xiaoshuai Zhang, Haoqiang Fan, Haibin Huang, Jiangyu Liu, Jiaming Liu, Jiaying Liu, Jue Wang, and Jian Sun. Disentangled image matting. In ICCV, pp. 8819-8828, 2019.
Liang-Chieh Chen, George Papandreou, lasonas Kokkinos, Kevin Murphy, and Alan L Yuille. Deeplab: Semantic image segmentation with deep convolutional nets, atrous convolution, and fully connected crfs. TPAMI, 40(4):834-848, 2017.
Qifeng Chen, Dingzeyu Li, and Chi-Keung Tang. Knn mat—ting. TPAMI, 35(9):2175-2188, 2013.
Yung-Yu Chuang, Brian Curless, David H Salesin, and Richard Szeliski. A bayesian approach to digital matting. In CVPR, vol. 2, pp. II-II. IEEE, 2001.
Jia Deng, Wei Dong, Richard Socher, Li-Jia Li, Kai Li, and Li Fei-Fei. Imagenet: A large-scale hierarchical image database. In CVPR, pp. 248-255. Ieee, 2009.
Mark Everingham, Luc Van Gool, Christopher KI Williams, John Winn, and Andrew Zisserman. The pascal visual object classes (voc) challenge. IJCV, 88(2):303-338, 2010.
Eduardo SL Gastal and Manuel M Oliveira. Shared sampling for real-time alpha matting. In Computer Graphics Forum, vol. 29, pp. 575-584. Wiley Online Library, 2010.
Priya Goyal, Piotr Dollar, Ross Girshick, Pieter Noordhuis, Lukasz Wesolowski, Aapo Kyrola, Andrew Tulloch, Yangqing Jia, and Kaiming He. Accurate, large mini-batch sgd: Training imagenet in 1 hour. arXiv preprint arXiv:1706.02677, 2017.
Vikas Gupta and Shanmuganathan Raman. Automatic trimap generation for image matting. In 2016 International Conference on Signal and Information Processing (ICon-SIP), pp. 1-5. IEEE, 2016.
Kaiming He, Christoph Rhemann, Carsten Rother, Xiaoou Tang, and Jian Sun. A global sampling method for alpha matting. In CVPR, pp. 2049-2056. IEEE, 2011.
Kaiming He, Jian Sun, and Xiaoou Tang. Fast matting us-ing large kernel matting laplacian matrices. In CVPR, pp. 2165-2172. IEEE, 2010.
Qiqi Hou and Feng Liu. Context-aware image matting for simultaneous foreground and alpha estimation. In ICCV, pp. 4130-4139, 2019.
Chang-Lin Hsieh and Ming-Sui Lee. Automatic trimap generation for digital image matting. In 2013 Asia-Pacific Signal and Information Processing Association Annual Summit and Conference, pp. 1-5. IEEE, 2013.
Philip Lee and Ying Wu. Nonlocal matting. In CVPR, pp. 2193-2200. IEEE, 2011.
Anat Levin, Dani Lischinski, and Yair Weiss. A closed-form solution to natural image matting. TPAMI, 30(2):228-242, 2007.
Anat Levin, Alex Rav-Acha, and Dani Lischinski. Spectral matting. TPAMI, 30(10):1699-1712, 2008.
Yaoyi Li and Hongtao Lu. Natural image matting via guided contextual attention. In AAAI, vol. 34, pp. 11450-11457, 2020.
Tsung-Yi Lin, Michael Maire, Serge Belongie, James Hays, Pietro Perona, Deva Ramanan, Piotr Dollar, and C Lawrence Zitnick. Microsoft coco: Common objects in context. In ECCV, pp. 740-755. Springer, 2014.
Jinlin Liu, Yuan Yao, Wendi Hou, Miaomiao Cui, Xuansong Xie, Changshui Zhang, and Xian-sheng Hua. Boosting semantic human matting with coarse annotations. In CVPR, pp. 8563-8572, 2020.
Ilya Loshchilov and Frank Hutter. Sgdr: Stochastic gradient descent with warm restarts.ICLR, 2017.
Hao Lu, Yutong Dai, Chunhua Shen, and Songcen Xu. Indices matter: Learning to index for deep image matting. In ICCV, pp. 3266-3275, 2019.
Sebastian Lutz, Konstantinos Amplianitis, and Aljosa Smolic. Alphagan: Generative adversarial networks for natural image matting.BMVC, 2018.
Yu Qiao, Yuhao Liu, Xin Yang, Dongsheng Zhou, Mingliang Xu, Qiang Zhang, and Xiaopeng Wei. Attention-guided hierarchical structure aggregation for image matting. In CVPR, pp. 13676-13685, 2020.
Soumyadip Sengupta, Vivek Jayaram, Brian Curless, Steven M Seitz, and Ira Kemelmacher-Shlizerman. Background matting: The world is your green screen. In CVPR, pp. 2291-2300, 2020. Part 1.
Soumyadip Sengupta, Vivek Jayaram, Brian Curless, Steven M Seitz, and Ira Kemelmacher-Shlizerman. Background matting: The world is your green screen. In CVPR, pp. 2291-2300, 2020. Part 2.
Ehsan Shahrian, Deepu Rajan, Brian Price, and Scott Cohen. Improving image matting using comprehensive sampling sets. InCVPR, pp. 636-643, 2013.
Xiaoyong Shen, Xin Tao, Hongyun Gao, Chao Zhou, and Jiaya Jia. Deep automatic portrait matting. In ECCV, pp. 92-107. Springer, 2016.
Jian Sun, Jiaya Jia, Chi-Keung Tang, and Heung-Yeung Shum. Poisson matting. In SIGGRAPH, pp. 315-321. 2004.
Jingwei Tang, Yagiz Aksoy, Cengiz Oztireli, Markus Gross, and Tunc Ozan Aydin. Learning-based sampling for natural image matting. InCVPR, pp. 3055-3063, 2019.
Jue Wang and Michael F Cohen. Optimized color sampling for robust matting. In CVPR, pp. 1-8. IEEE, 2007.
Jue Wang and Michael F Cohen. Image and video matting: a survey. Now Publishers Inc, 2008.
Saining Xie and Zhuowen Tu. Holistically-nested edge detection. InICCV, pp. 1395-1403, 2015.
Ning Xu, Brian Price, Scott Cohen, and Thomas Huang. Deep image matting. InCVPR, pp. 2970-2979, 2017.
Sangdoo Yun, Dongyoon Han, Seong Joon Oh, Sanghyuk Chun, Junsuk Choe, and Youngjoon Yoo. Cutmix: Regularization strategy to train strong classifiers with localizable features. In ICCV, pp. 6023-6032, 2019.
He Zhang, Jianming Zhang, Federico Perazzi, Zhe Lin, and Vishal M Patel. Deep image compositing. WACV, 2021.
Yunke Zhang, Lixue Gong, Lubin Fan, Peiran Ren, Qixing Huang, Hujun Bao, and Weiwei Xu. A late fusion cnn for digital matting. In CVPR, pp. 7469-7478, 2019.
Yuanjie Zheng and Chandra Kambhamettu. Learning based digital matting. In ICCV, pp. 889-896. IEEE, 2009.

* cited by examiner

GENERATING REFINED ALPHA MATTES UTILIZING GUIDANCE MASKS AND A PROGRESSIVE REFINEMENT NETWORK

BACKGROUND

Improvements to computer processing technologies have led to significant advancements in the field of digital image processing and editing. For example, conventional image processing systems can detect content portrayed within digital images and manipulate the digital images in a variety of ways to generate enhanced digital images. To illustrate, some conventional systems generate trimap segmentations and, in turn, alpha mattes for use in image matting to extract certain portions of a digital image and generate enhanced digital images with modified background or foreground features. Other conventional image processing systems utilize machine learning models that process input digital images to generate alpha mattes. Despite these improvements, conventional systems continue to suffer from a number of technical deficiencies with regard to model flexibility, accuracy, robustness, and efficiency of implementing computing devices.

BRIEF SUMMARY

Embodiments of the present disclosure provide benefits and/or solve one or more of the foregoing or other problems in the art with systems, non-transitory computer-readable media, and methods that utilize a mask-guided matting framework to progressively refine uncertain regions in an alpha matte. For example, the disclosed systems utilize a matting neural network to generate alpha mattes by processing a digital image and a guidance input comprising one of a variety of coarse masks. In one or more embodiments, the disclosed systems utilize a progressive refinement network that refines and selectively fuses alpha mattes from different feature levels of the matting neural network to identify portions of the foreground and background. To illustrate, the disclosed systems combine alpha mattes from different feature levels of the matting neural network using a boundary uncertainty mask to generate an updated (e.g., refined or final) alpha matte. In this manner, the disclosed systems can efficiently and flexibly generate enhanced, refined alpha mattes for digital image matting.

In one or more embodiments, the disclosed systems also improve efficiency and accuracy in building or training machine learning models. For example, the disclosed systems learn parameters for the matting neural network by perturbing ground truth guidance masks via dilation, erosion, and/or random patch overwriting to enhance robustness to external guidance. Moreover, in one or more embodiments the disclosed systems learn parameters for a foreground color prediction model by using random alpha blending to generate synthetic learning data of blended foreground and background portions of digital images. In this manner, the disclosed systems can diversify learning data and improve generalization for a wide variety of applications.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
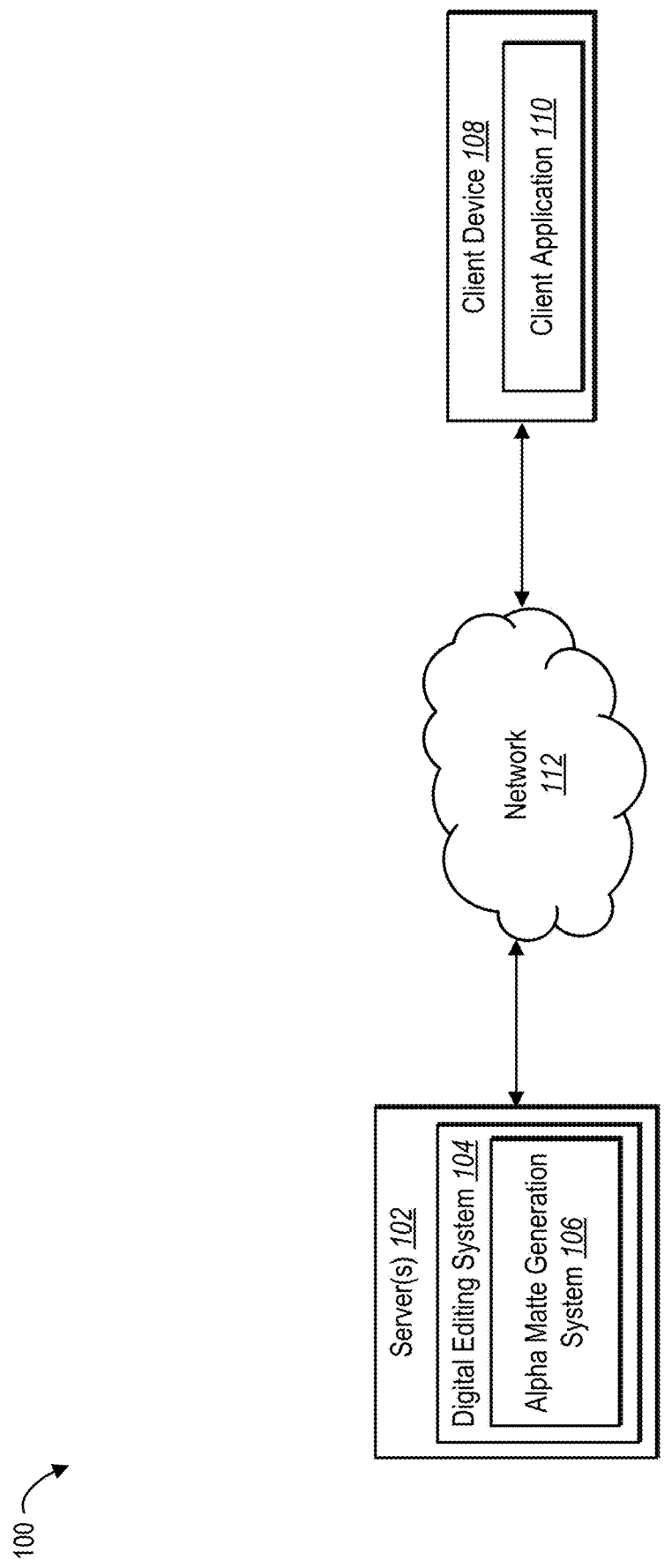
FIG. 1 illustrates a computing system environment for implementing an alpha matte generation system in accordance with one or more embodiments.

One or more embodiments described herein include an alpha matte generation system that utilizes a mask-guided matting framework to processes digital images and input guidance masks and generate refined alpha mattes. For instance, the alpha matte generation system utilizes a progressive refinement network to combine alpha mattes from different layers of a matting neural network to refine uncertain regions and generate a final alpha matte. To illustrate, in one or more embodiments the alpha matte generation system utilizes a matting neural network to process a digital image and a guidance mask to generate alpha mattes at a variety of resolutions. The alpha matte generation system utilizes a progressive refinement network to iteratively combine higher resolution alpha mattes (which are more efficient at resolving boundary regions) with lower resolution alpha mattes (which are more efficient at resolving core regions of the foreground or background). In this manner, the alpha matte generation system can efficiently and accurately generate refined alpha mattes based on a variety of flexible coarse guidance masks.

As mentioned above, in some embodiments, the alpha matte generation system generates alpha mattes at different layers of a matting neural network. For example, in one or more embodiments, the alpha matte generation system utilize a matting neural network that includes an encoder-decoder architecture. The alpha matte generation system utilizes the matting neural network to process an input digital image and coarse guidance mask (e.g., a rough binary mask or trimap) and then generates different alpha mattes at individual decoder layers of the matting neural network. For example, the alpha matte generation system generates alpha mattes with increasingly higher resolutions at different decoder layers of the matting neural network.

As mentioned above, in one or more embodiments the alpha matte generation system also combines alpha mattes from different layers of the matting neural network. In particular, the alpha matte generation system utilizes a progressive refinement network to combine different alpha mattes from different layers of the matting neural network to iteratively improve regions of uncertainty. For instance, in one or more embodiments the progressive refinement network uses lower-resolution features corresponding to a first alpha matte to define core regions of the foreground and background. Moreover, the progressive refinement network uses higher-resolution features corresponding to a second alpha matte to refine more detailed boundary regions.

To illustrate, in one or more embodiments the alpha matte generation system generates a boundary uncertainty mask from the alpha values of a first (lower-resolution) alpha matte. In particular, the progressive refinement network generates the boundary uncertainty mask from alpha values of the first alpha matte that indicate areas/pixels of uncertainty within the first alpha matte. This boundary uncertainty mask thus highlights regions of uncertainty within the digital image. In certain implementations, the alpha matte generation system then utilizes the boundary uncertainty mask to determine a boundary alpha matte at a higher resolution. In particular, in one or more embodiments the progressive refinement network applies the boundary uncertainty mask to a second (high-resolution) alpha matte from a second layer of the matting neural network to generate a boundary alpha matte.

Similarly, in one or more embodiments, the alpha matte generation system generates a core certainty mask. For example, the progressive refinement network generates the core certainty mask from alpha values of the first alpha matte that indicate areas/pixels of certainty. This core certainty mask thus reflects areas of certainty from the digital image as reflected in the first (lower-resolution) alpha matte output of the mask neural network. In one or more embodiments, the alpha matte generation system generates a core alpha matte by applying the core certainty mask to the first alpha matte.

In one or more embodiments, the alpha matte generation system combines the first alpha matte and second alpha matte from the matting neural network by combining the boundary alpha matte and the core alpha matte. As just mentioned, the boundary alpha matte reflects an area of uncertainty (e.g., at boundaries) based on a second (higher resolution) alpha matte. The core alpha matte reflects a region of certainty for a foreground and/or background region based on a first (lower resolution) alpha matte. By combining the boundary alpha matte and the core alpha matte, one or more embodiments of the alpha matte generation system generate a refined alpha matte with an accurate foreground/background region and improved (e.g., smaller, more refined) region of uncertainty.

In one or more embodiments, the alpha matte generation system utilizes the progressive refinement network to iteratively process different alpha mattes from different layers of the matting neural network in generating a final alpha matte for a digital image. To illustrate, the alpha matte generation system generates an initial refined alpha matte by applying the progressive refinement network to a first alpha matte (from a first layer of the matting neural network) and a second alpha matte (from a second layer of the matting neural network). The alpha matte generation system then generates an additional refined alpha matte by applying the progressive refinement network to the initial refined alpha matte and a third alpha matte (from a third layer of the matting neural network). Accordingly, the alpha matte generation system progressively processes different alpha matte outputs of the alpha matte network in generating a final alpha matte for the digital image.

To illustrate, the alpha matte generation system segregates foreground portions and background portions in a digital image by using alpha values from the final alpha matte to separate foreground pixels/colors and background pixels/colors in the digital image. Additionally, in certain embodiments, the alpha matte generation system generates an enhanced or modified digital image by replacing at least one of the segregated foreground or background portions of the digital image.

As mentioned previously, in some embodiments, the alpha matte generation system also builds or trains the matting neural network and/or other machine learning models. The alpha matte generation system can utilize a variety of learning (e.g., training) approaches to improve system robustness and accuracy. For example, in some embodiments, the alpha matte generation system implements one or more perturbation operations to augment ground truth guidance masks. In particular embodiments, the alpha matte generation system applies binarizing, dilation, erosion, and/or random patch processes to improve the flexibility and accuracy of the trained models. In one or more embodiments, the alpha matte generation system also cuts and swaps portions or patches of ground truth alpha mattes to generate more diverse guidance masks that can further improve the accuracy of the trained models.

Moreover, in one or more embodiments the alpha matte generation system perturbs masks utilized within the progressive refinement network. To illustrate, the alpha matte generation system applies various operations to learning boundary uncertainty masks of the progressive refinement network, create variation within refined alpha mattes. This can further improve robustness of the resulting trained models.

In addition, in some embodiments, the alpha matte generation system uses random alpha blending to improve color prediction. For example, the alpha matte generation system trains a matting neural network and/or a foreground color prediction model to identify foreground colors (utilized to generate more accurate enhanced digital images). In one or more embodiments, the alpha matte generation system trains the matting neural network and/or foreground color prediction model by applying random alpha blending to foreground and background colors of training digital images. Utilizing the random alpha blending approach, the alpha matte generation system can diversify learning alpha mattes and build more accurate and robust models.

As mentioned above, a number of problems and shortcomings exist with conventional image processing systems, particularly with regard to flexibility, accuracy, and efficiency of implementing devices. For example, many conventional image processing systems require well-annotated trimaps associated with digital images to be able to predict corresponding alpha mattes. By rigidly requiring well-defined trimaps (or other required input types), these conventional systems are often incompatible with non-interactive applications and fail to operate on devices with limited screen space for interaction. Accordingly, the inflexibility of conventional image processing systems limits wide applicability to different applications and implementing devices.

In addition to lack of system flexibility, conventional image processing systems are also inaccurate. For example, some conventional systems utilize machine learning models (e.g., quality unification networks or attention networks) that analyze digital images to generate alpha mattes. These systems, however, generally generate alpha mattes with reduced accuracy and precision.

In addition, conventional image processing systems often generate inaccurate foreground color predictions. In many cases, conventional image processing systems use color labels (e.g., human-generated color labels) to train models in generating color predictions. This approach, however, often results in inaccurate and noisy predictions, particularly in boundary regions of uncertainty. Accordingly, conventional image processing systems can generate color spills and other types of artifacts into images based on poor learning processes. Further, these inaccuracies in the learning process can also percolate and lead to unstable prediction behaviors.

In addition to the foregoing problems, conventional image processing systems are also inefficient. For example, many conventional image processing systems generate alpha mattes and modified digital images with a variety of artifacts. Accordingly, client devices implementing conventional systems often implement numerous touch-up and modification processes to correct artifacts in finalizing digital images. These increased processes and computer interactions within graphical user interfaces are time consuming and computationally inefficient.

The alpha matte generation system can provide several improvements over conventional image processing systems. For example, the alpha matte generation system can be implemented across a variety of different computing devices and interactive/non-interactive applications. Indeed, as mentioned above, alpha matte generation system can flexibly accommodate guidance masks of many varieties. For instance, the alpha matte generation system can utilize user-defined guidance masks or model-predicted guidance masks, whether coarse detailed or fine detailed. Specifically, as discussed in greater detail below, the alpha matte generation system can analyze guidance masks, such as binary segmentation masks, alpha mattes, trimaps, etc.

Further, the alpha matte generation system can generate more accurate alpha mattes and enhanced digital images compared to conventional image processing systems. For example, the alpha matte generation system can increase alpha matte accuracy by processing a digital image and guidance map utilizing a matting neural network that includes a progressive refinement network. For instance, the alpha matte generation system can generate increased refinement and greater levels of accuracy and detail by combining intermediate alpha mattes generated by different layers of the matting neural network at different resolutions. Indeed, by leveraging intermediate alpha mattes at different resolutions the alpha matte generation system can generate more accurate alpha mattes and enhanced digital images.

In addition, the alpha matte generation system can utilize various training approaches that further improve accuracy in alpha matte prediction and foreground color prediction. For example, rather than depend on inaccurate/noisy foreground color labels like many conventional image processing systems, the alpha matte generation system can utilize random alpha blending to avoid bias in color labels. By using random alpha blending, the alpha matte generation system can introduce more diverse training samples and also improve foreground color prediction accuracy (particularly in boundary regions). As another example, the alpha matte generation system can perturb various elements in the training process (e.g., external inputs to the system as a whole and inputs within the progressive refinement network). For instance, by perturbing ground truth guidance masks associated with digital images, the alpha matte generation system can improve model robustness over conventional image processing systems. Similarly, the alpha matte generation system can increase model robustness by randomly perturbing uncertainty masks within the progressive refinement network.

Moreover, the alpha matte generation system can also improve efficiency of implementing devices. For example, the alpha matte generation system can decrease computer processes and user interactions to address artifacts in a digital image. Indeed, by increasing the accuracy of alpha matte generation the alpha matte generation system can reduce user interactions needed to generate enhanced digital images that portray realistic, modified foreground or background pixels. In turn, implementing devices of the alpha matte generation system can improve computer resources, including memory and processing power.

Additional detail will now be provided in relation to illustrative figures portraying example embodiments and implementations of the alpha matte generation system. For example, FIG. 1 illustrates a computing system environment (or "environment") 100 for implementing an alpha matte generation system 106 in accordance with one or more embodiments. As shown in FIG. 1, the environment 100 includes server(s) 102, a client device 108, and a network 112. In one or more embodiments, each of the components of the environment 100 communicate (or are configured to communicate) via the network 112. Example networks are discussed in more detail below in relation to FIG. 8.

As shown in FIG. 1, the environment 100 includes the client device 108. The client device 108 includes one of a variety of computing devices, including a smartphone, tablet, smart television, desktop computer, laptop computer, virtual reality device, augmented reality device, or other computing device as described in relation to FIG. 8. Although FIG. 1 illustrates a single client device 108, in some embodiments the environment 100 includes multiple client devices 108. In these or other embodiments, the client device 108 communicates with the server(s) 102 via the network 112. For example, the client device 108 receives user input and provides to the server(s) 102 information pertaining to the user input (e.g., that relates to generating a guidance mask, selecting a digital image to perform image matting, etc.).

As shown, the client device 108 includes a corresponding client application 110. In particular embodiments, the client application 110 comprises a web application, a native application installed on the client device 108 (e.g., a mobile application, a desktop application, etc.), or a cloud-based application where part of the functionality is performed by the server(s) 102. In some embodiments, the client application 110 presents or displays information to a user associated with the client device 108, including a final alpha matte for use in segregating an object portrayed in a digital image from a background of the digital image. For example, the client application 110 identifies user interactions via a user interface of the client device 108 to select a digital image, generate a guidance mask, or utilize a final alpha matte for image matting. In these or other embodiments, the term digital image refers to a digital visual representation (e.g., a digital symbol, graphic, picture, icon, or illustration). For example, the term "digital image" includes digital files with the following file extensions: JPG, TIFF, BMP, PNG, RAW, or PDF.

In some embodiments, the client application 110 causes the client device 108 to generate, store, receive, transmit, and/or execute electronic data, such as executable instructions for generating a final alpha matte. For example, the executable instructions include generating a first alpha matte for a digital image via a first layer of a matting neural network utilizing the digital image and a guidance mask corresponding to an object portrayed in the digital image. In some embodiments, the client application 110 then causes the client device 108 to generate a second alpha matte for the digital image via a second layer of the matting neural network utilizing the digital image and the guidance mask. Additionally, in one or more embodiments, the alpha matte generation system 106 determines a final alpha matte by combining the first alpha matte and the second alpha matte. These and other aspects of the client application 110 implementing the alpha matte generation system 106 are described in more detail below in relation to the subsequent figures.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital editing system 104 that manages digital files (e.g., digital images for image matting). For example, in one or more embodiments, the digital editing system 104 receives, transmits, organizes, stores, updates, and/or recommends digital images to/from the client device 108. For instance, in certain implementations, the digital editing system 104 comprises a data store of digital images from which the client device 108 selects a digital image to perform image matting via the client application 110.

Although FIG. 1 depicts the alpha matte generation system 106 located on the server(s) 102, in some embodiments, the alpha matte generation system 106 is implemented by one or more other components of the environment 100 (e.g., by being located entirely or in part at one or more of the other components). For example, in one or more embodiments, the client device 108 and/or a third-party device implement the alpha matte generation system 106.

In some embodiments, though not illustrated in FIG. 1, the environment 100 has a different arrangement of components and/or has a different number or set of components altogether. For example, in certain embodiments, the environment 100 includes a third-party server (e.g., for storing digital images or other data). As another example, the client device 108 communicates directly with the server(s) 102, bypassing the network 112.

Figure 2:
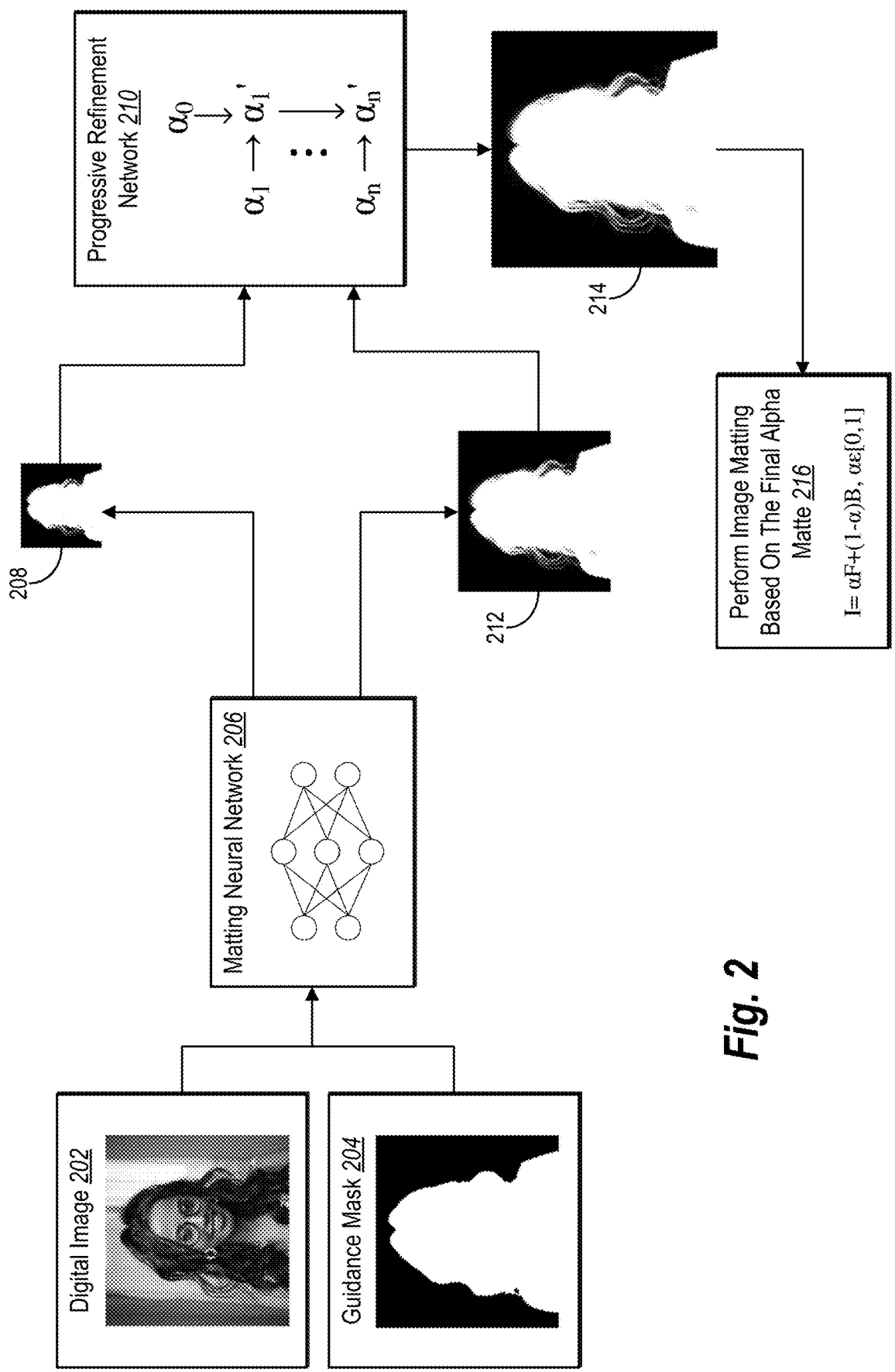
FIG. 2 illustrates an alpha matte generation system utilizing a matting neural network and a progressive refinement network to generate a final alpha matte in accordance with one or more embodiments.

As mentioned above, the alpha matte generation system 106 can flexibly and efficiently generate an accurate final alpha matte by utilizing a progressive refinement network to process alpha mattes from a matting neural network. FIG. 2 illustrates the alpha matte generation system 106 utilizing a matting neural network 206 and a progressive refinement network 210 to generate a final alpha matte 214 in accordance with one or more embodiments. In particular, FIG. 2 shows the alpha matte generation system 106 utilizing the matting neural network 206 to process a digital image 202 and a guidance mask 204 to generate a first alpha matte 208 and a second alpha matte 212. Based on the first alpha matte 208 and the second alpha matte 212, the alpha matte generation system 106 uses the progressive refinement network 210 to generate the final alpha matte 214 for subsequent use in performing an image matting process.

As shown in FIG. 2, the alpha matte generation system 106 can access, identify, or receive the digital image 202. In some embodiments, the digital image 202 comprises an image file selected by a client device. For instance, the digital image 202 comprises an image file selected from a data store or an image file uploaded from memory storage of a client device. As another example, the digital image 202 comprises an image included within a digital document or an image that is copied and pasted from a website or digital communication (e.g., an SMS text message, a social media post, news article, video clip, or email message).

As further shown in FIG. 2, the alpha matte generation system 106 can access, identify, generate, or receive the guidance mask 204 (e.g., to provide context to the digital image 202). The term guidance mask can include a classification, indication, or map of a plurality of pixels portraying one or more objects. For example, a guidance mask can include a binary segmentation mask (e.g., a selection that definitively includes a first set of pixels and definitively excludes a second set of pixels as corresponding to an object). In another example, a guidance mask can include an alpha matte (e.g., a course alpha matte that is not as detailed, defined, or accurate as a final alpha matte). In yet another example, a guidance mask can include a trimap (e.g., a course or rough trimap).

In more detail, an alpha matte (as a type of guidance mask) refers to a representation of a digital image that indicates, for one or more pixels, a corresponding alpha value (e.g., an opacity value or blending amount between foreground and background color values). In at least some alpha mattes, foreground portions of a digital image correspond to alpha values at or above some upper bound (e.g., a threshold value of one or "1"). Likewise, in some alpha mattes, background portions of a digital image correspond to alpha values at or below some lower bound (e.g., a threshold value of zero or "0"). Additionally, in certain alpha mattes, boundary regions or areas of uncertainty correspond to alpha values between an upper and lower bound (e.g., between threshold values of zero and one).

In addition, a trimap (as a type of guidance mask) refers to a representation of a digital image that includes a partition of the digital image into a foreground region, a background region, and a blended boundary region. In particular, a trimap includes a plurality of pixels associated with a defined foreground region that corresponds to a portion of the digital image portraying an object, a plurality of pixels associated with a defined background region corresponding to a portion of the digital image outside the object, and a plurality of pixels associated with a portion of the digital image that includes both foreground and background elements (e.g., an uncertainty region). Thus, in particular embodiments, a trimap includes a visualization of each region using different colors or display values such as black (e.g., for a background region), white (e.g, for a foreground region), and gray (e.g., for a blended boundary region). Additionally or alternatively, the different partitions of a trimap may be labeled or annotated.

In some embodiments, the alpha matte generation system 106 generates the guidance mask 204 utilizing an interactive user segmentation process (e.g., as described below in relation to FIG. 3A). In other embodiments, the alpha matte generation system 106 generates the guidance mask 204 utilizing an object segmentation model (e.g., as also described below in relation to FIG. 3A). As depicted in FIG. 2, the guidance mask 204 includes a binary segmentation mask that coarsely selects the object (e.g., a person) portrayed in the digital image 202. Noticeably, however, the guidance mask 204 excludes in black color some of the finer details associated with the object (e.g., certain hair strands associated with the person).

Using the matting neural network 206, the alpha matte generation system 106 processes the digital image 202 and the guidance mask 204. A neural network refers to a computer representation that can be tuned (e.g., trained) based on inputs to approximate unknown functions. For instance, a neural network includes one or more layers or artificial neurons that approximate unknown functions by analyzing known data at different levels of abstraction. In some embodiments, a neural network includes a convolutional neural network, a recurrent neural network, a generative adversarial neural network, a variational auto-encoder, a feed forward neural network, an encoder/decoder network, or a graph neural network. A matting neural network refers to a neural network for generating an alpha matte.

A matting neural network can include a variety of various architectures. In one or more embodiments, a matting neural network comprises a ResNet34-UNet architecture with Atrous Spatial Pyramid Pooling (e.g., as described by Yaoyi Li and Hongtao Lu, *Natural Image Matting Via Guided Contextual Attention*, In AAAI, vol. 34, pp. 11450-11457 (2020), (hereafter "Li et al."); and Liang-Chieh Chen, George Papandreou, Iasonas Kokkinos, Kevin Murphy, and Alan L. Yuille, *Deeplab: Semantic Image Segmentation With Deep Convolutional Nets, Atrous Convolution, And Fully Connected Crfs*, In TPAMI, 40(4):834-848 (2017) (hereafter "Chen et al.")). The contents of Li et al. and Chen et al. are expressly incorporated herein by reference.

Based on analyses of the digital image 202 and the guidance mask 204, the matting neural network 206 generates the first alpha matte 208 and the second alpha matte 212. For example, at an initial layer of the matting neural network 206, the alpha matte generation system 106 generates the first alpha matte 208 based on a first analysis of the guidance mask 204 and the matting neural network 206 (e.g., as described below in relation to FIG. 3A). Similarly, the matting neural network 206 generates the second alpha matte 212 based on an additional analysis of the digital image 202 and the guidance mask 204 at a subsequent layer of the matting neural network 206. In this manner, the first alpha matte 208 and the second alpha matte 212 comprise the raw, unmodified alpha matte outputs corresponding to particular layers of the matting neural network 206.

Using the progressive refinement network 210, the alpha matte generation system 106 combines the first alpha matte 208 and the second alpha matte 212 to generate the final alpha matte 214. Indeed, as will be described below in relation to FIG. 3B, the progressive refinement network 210 generates the final alpha matte 214 by combining the first alpha matte 208 and the second alpha matte 212 using particular combinations of masks that help to strategically refine certain alpha matte portions.

Moreover, at an act 216, the alpha matte generation system 106 performs image matting based on the final alpha matte 214. In particular embodiments, the alpha matte generation system 106 performs image matting by deconstructing pixel color values for the digital image 202 (denoted as "I" in FIG. 2) into the sum of two samples that account for the alpha values ("α") of the final alpha matte 214. For example, a first sample corresponds to foreground pixel color values (denoted as "F") that are multiplied by corresponding alpha values of the final alpha matte 214. Further, a second sample corresponds to background pixel color values (denoted as "B") that are multiplied by a corresponding difference between one and the alpha values (or "1-α"). In this manner, the alpha matte generation system 106 can segregate (e.g., selects, extracts, and/or identifies) an object portrayed in the digital image 202 from a background of the digital image 202 by utilizing the final alpha matte 214. Moreover, the alpha matte generation system 106 can generate an enhanced digital image (e.g., by removing or replacing the background or foreground of an input digital image).

Although not expressly shown in FIG. 2, in one or more embodiments, the alpha matte generation system 106 generates alpha mattes in addition to the first alpha matte 208 and the second alpha matte 212 in order to generate the final alpha matte 214. For example, in some embodiments, the matting neural network 206 generates a third alpha matte at another layer of the matting neural network 206. As indicated by $\alpha_0, \alpha_1, \ldots \alpha_n$ in FIG. 2, the progressive refinement network 210 combines the first alpha matte 208, the second alpha matte 212, and the third alpha matte in various refined alpha mattes (e.g., $\alpha_1', \ldots \alpha_n'$) to generate the final alpha matte 214 as explained in greater detail below.

As mentioned above, the alpha matte generation system 106 can utilize a progressive refinement network to combine and gradually refine alpha mattes output from different layers of a matting neural network. Based on this gradual refinement over multiple refinement iterations, the alpha matte generation system 106 can ultimately generate an accurate final alpha matte (e.g., for subsequent use in performing image matting). FIGS. 3A-3B illustrate the alpha matte generation system 106 generating a final alpha matte by utilizing the progressive refinement network 210 to process particular combinations of intermediate output alpha mattes and/or refined alpha mattes in accordance with one or more embodiments.

Figure 3A:
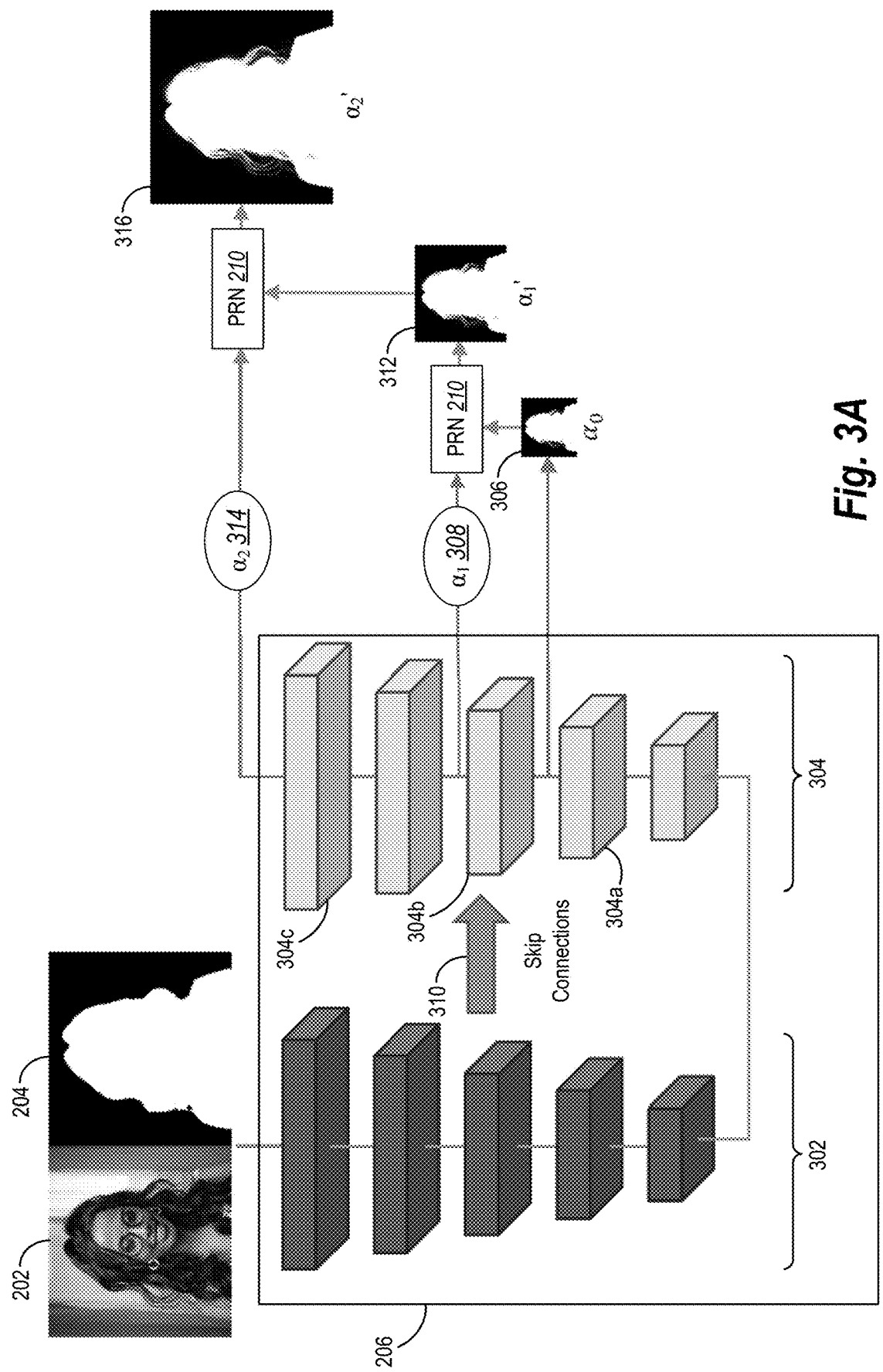
FIGS. 3A-3B illustrate an alpha matte generation system generating a final alpha matte by utilizing a progressive refinement network to process particular combinations of alpha mattes in accordance with one or more embodiments.
Figure 3B:
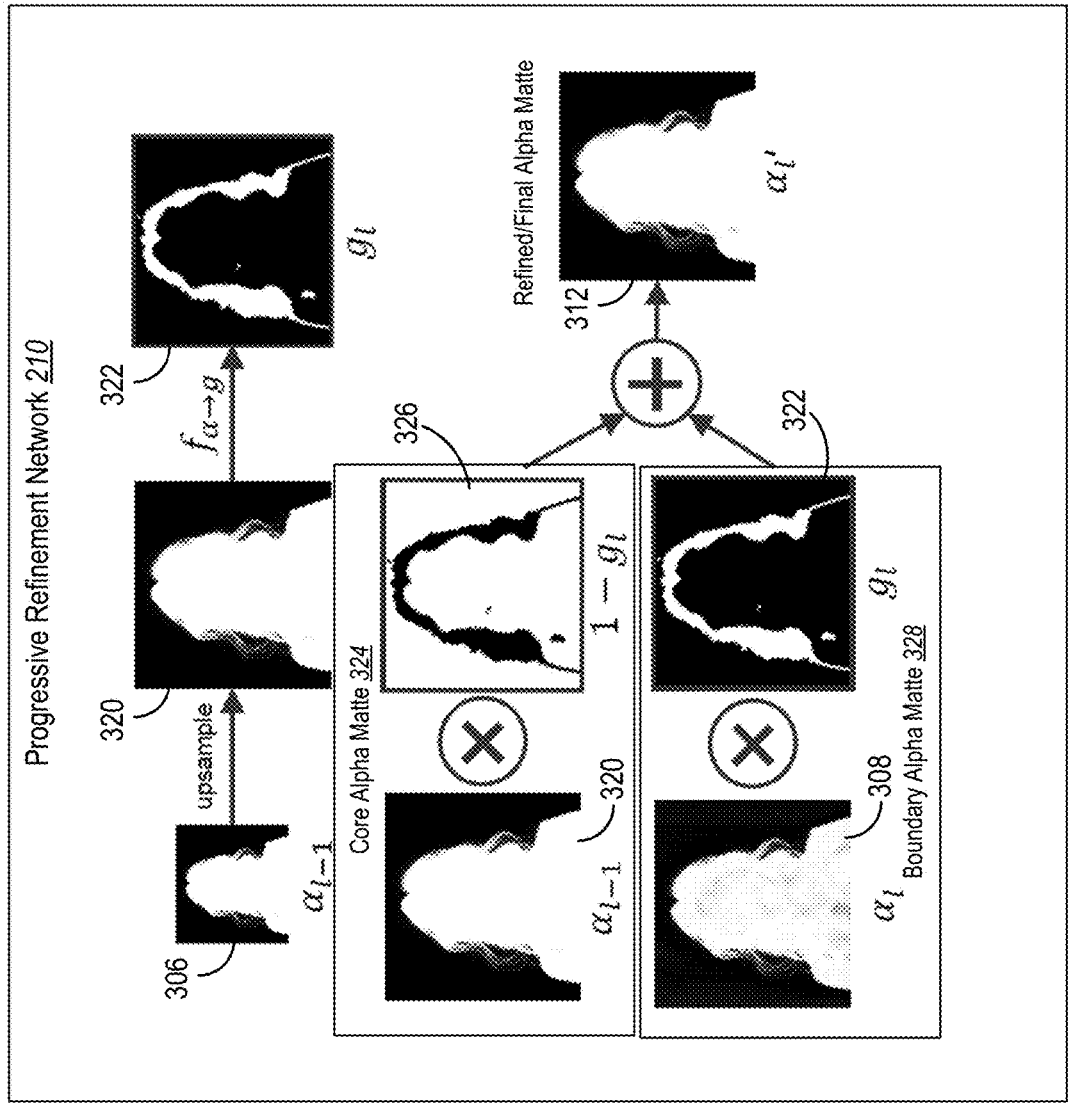

As shown in FIG. 3A, the alpha matte generation system 106 uses the matting neural network 206 to process inputs comprising the digital image 202 and the guidance mask 204. Although these inputs are described above in relation to FIG. 2, additional detail is now provided regarding various embodiments of generating the guidance mask 204. For example, in certain implementations, the alpha matte generation system 106 generates the guidance mask 204 utilizing interactive user segmentation to select one or more pixels within the digital image 202.

In some embodiments, the alpha matte generation system 106 generates the guidance mask 204 based on a variety of different user inputs. For example, the alpha matte generation system 106 identifies a regional input (e.g., a user interaction identifying a region or portion of a digital image). As another example, the alpha matte generation system 106 identifies a boundary input (e.g., a user interaction identifying a boundary or edge of a target object within the digital image).

In additional or alternative embodiments, the alpha matte generation system 106 generates the guidance mask 204 based on interactive user segmentation of a trimap. For example, the alpha matte generation system 106 generates a trimap in response to identifying foreground regions, background regions, and boundary/unknown regions according to user-designated labels of these regions within the digital image 202. Similarly, in certain embodiments, the alpha matte generation system 106 generates a trimap for the guidance mask 204 based on one or more input modalities described above.

In other embodiments, the alpha matte generation system 106 generates the guidance mask 204 utilizing one or more automatic or semi-automatic selection methods. For example, in some embodiments, the alpha matte generation system 106 utilizes a salient object segmentation neural network that automatically selects a salient object portrayed in a digital image (e.g., by utilizing a convolutional neural network as described by Pao et al. in U.S. patent application Ser. No. 15/967,928, filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, the contents of which are expressly incorporated herein by reference). In additional or alternative embodiments, the alpha matte generation system 106 utilizes a foreground/background segmentation algorithm. Additionally or alternatively, the alpha matte generation system 106 utilizes a salient content neural network to segment foreground and background pixels in a digital image (e.g., as described in U.S. patent application Ser. No. 15/799,395, filed on Oct. 31, 2017, entitled DEEP SALIENT CONTENT NEURAL NETWORKS FOR EFFICIENT DIGITAL OBJECT SEGMENTATION, the contents of which are expressly incorporated herein by reference).

In particular embodiments, the alpha matte generation system 106 automatically generates a trimap or an alpha matte as the guidance mask 204. For example, in certain implementations, the alpha matte generation system 106 automatically generates a trimap as described by Zhang et al. in U.S. patent application Ser. No. 16/988,036, filed on Aug. 7, 2020, entitled AUTOMATICALLY GENERATING A TRIMAP SEGMENTATION FOR A DIGITAL IMAGE BY UTILIZING A TRIMAP GENERATION NEURAL NETWORK, hereafter "Zhang et al."; or Soumyadip Sengupta, Vivek Jayaram, Brian Curless, Steven M. Seitz, and Ira Kemelmacher-Shlizerman, *Background Matting: The World Is Your Green Screen*, In CVPR, pp. 2291-2300, (2020), hereafter "Sengupta et al." The contents of Zhang et al. and Sengupta et al. are expressly incorporated herein by reference.

As another example, the alpha matte generation system 106 automatically generates an alpha matte as the guidance mask 204 (e.g., by utilizing a deep neural network to predict an initial/soft alpha matte from a trimap segmentation as described by Price et al. in U.S. Pat. No. 10,255,681, entitled IMAGE MATTING USING DEEP LEARNING, the contents of which are expressly incorporated herein by reference).

In other embodiments, the alpha matte generation system 106 need not generate the guidance mask 204. For example, in certain implementations, the alpha matte generation system 106 requests the guidance mask 204 from one or more client devices and/or third-party devices. As another example, the alpha matte generation system 106 retrieves the guidance mask 204 from one or more memory devices.

Additionally shown in FIG. 3A, the matting neural network 206 processes the digital image 202 and the guidance mask 204 utilizing encoder layers 302 and decoder layers 304 of the matting neural network 206. Although the matting neural network 206 can include myriad different network architectures and types of neural networks, in certain implementations, the encoder layers 302 comprises a set of convolutional layers. Accordingly, in one or more embodiments, the encoder layers 302 extracts various features or components of the digital image 202 and the guidance mask 204. In particular embodiments, a first layer of the encoder layers 302 processes the digital image 202 and the guidance mask 204 as a four-channel input composed of a red-color channel, a green-color channel, a blue-color channel, and a guidance-input channel. In addition, the encoder layers 302 are connected to the decoder layers 304 via a series of network connections and/or via one or more skip-connections 310 that can bypass one or more other layers in the network architecture. At the decoder layers 304 (e.g., as deconvolutional layers), the matting neural network 206 reconstructs or recovers encoded details of the digital image 202 and the guidance mask 204 to predict one or more alpha mattes.

In particular embodiments, specific decoder layers of the decoder layers 304 output predicted alpha mattes by decoding encoded elements of the digital image 202 and the guidance mask 204. For example, as shown in FIG. 3A, the decoder layers 304a-304c each generate a predicted alpha matte. Specifically, by processing the digital image 202 and the guidance mask 204, the first decoder layer 304a generates a first alpha matte 306, the second decoder layer 304b generates a second alpha matte 308, and the third decoder layer 304c generates a third alpha matte 314. In at least some embodiments, the foregoing decoder layers of the decoder layers 304 that output the alpha mattes (e.g., at strides 1, 4, and 8) comprise a specific network architecture for alpha prediction heads (e.g., Conv-BN-ReLU-Conv). In other embodiments not shown, additional or alternative layers of the decoder layers 304 may likewise generate alpha mattes (e.g., with the same, additional, or alternative alpha prediction heads).

In one or more embodiments, the matting neural network 206 generates predicted alpha mattes with increasing resolution (e.g., number of pixels or entries) as the matting neural network 206 progressively processes the digital image 202 and the guidance mask 204. For example, the alpha matte generation system 106 utilizes the matting neural network 206 to generate the first alpha matte 306 at a first resolution, the second alpha matte 308 at a second resolution, and the third alpha matte 314 at a third resolution. In this example, the first resolution of the first alpha matte 306 is lower than both the second and third resolutions for the second alpha matte 308 and the third alpha matte 314, respectively. In addition, the second resolution for the second alpha matte 308 is higher than the first resolution for the first alpha matte 306, but lower than the third resolution for the third alpha matte 314. Further, the third resolution for the third alpha matte 314 is higher than both of the first and second resolutions for the first alpha matte 306 and the second alpha matte 308, respectively. As will be discussed further below in relation to FIG. 3B, the alpha matte generation system 106 can leverage the different resolutions of the alpha mattes from the matting neural network 206 to refine certain portions of the alpha mattes.

Based on the alpha mattes from the matting neural network 206, FIG. 3A shows the alpha matte generation system 106 utilizing the progressive refinement network 210 to process specific combinations of alpha mattes over various refinement iterations. As used herein, the term progressive refinement network refers to one or more computer-based algorithms for combining alpha mattes. For example, a progressive refinement network can include computer-based algorithms for generating refined alpha mattes over refinement iterations by combining alpha mattes from different layers of a matting neural network. For example, in a first refinement iteration depicted in FIG. 3A, the alpha matte generation system 106 utilizes the progressive refinement network 210 to generate a refined alpha matte 312 by combining the first alpha matte 306 from the first decoder layer 304a and the second alpha matte 308 from the second decoder layer 304b. Subsequently, in a second refinement iteration, the alpha matte generation system 106 utilizes the progressive refinement network 210 to generate a final alpha matte 316 by combining the third alpha matte 314 from the third decoder layer 304c and the refined alpha matte 312 from the progressive refinement network 210.

The progressive refinement network 210 can leverage the lower resolution of a previous layer alpha matte to delineate more certain core regions in the previous layer alpha matte. In addition, the progressive refinement network 210 can leverage the higher resolution of a current layer alpha matte to delineate less certain boundary regions in the previous layer alpha matte. In turn, the alpha matte generation system 106 can generate a refined/final alpha matte based on the combined delineation according to the previous and current layer alpha mattes.

For example, FIG. 3B shows an example implementation of a first refinement iteration in which the progressive refinement network 210 combines the first alpha matte 306 from the first decoder layer 304a and the second alpha matte 308 from the second decoder layer 304b to generate the refined alpha matte 312. However, as mentioned previously, the progressive refinement network 210 can similarly perform subsequent refinement iterations. For example, in a second refinement iteration, the progressive refinement network 210 combines the third alpha matte 314 from the third decoder layer 304c and the refined alpha matte 312 from the progressive refinement network 210 to generate the final alpha matte 316.

With respect to the first refinement iteration, FIG. 3B illustrates the progressive refinement network 210 upsampling the first alpha matte 306 to generate a first upsampled alpha matte 320 that matches the resolution of the second alpha matte 308. As used herein, the term upsampling refers to increasing the size of a digital image or alpha matte to an increased resolution. In particular embodiments, upsampling an alpha matte can include adding rows and/or columns of pixels to the alpha matte to match the resolution and pixel dimensions of another alpha matte. In one example, upsampling includes duplicating rows and/or columns of pixels with the same alpha values. In another example, upsampling includes adding pixels by interpolating pixel color values (e.g., foreground color values, background color values, and alpha values) or alpha values according to one or more algorithms, such as nearest neighbor interpolation, bilinear interpolation, bicubic spline interpolation, generalized bicubic interpolation, etc.

As shown in FIG. 3B, the alpha matte generation system 106 utilizes the progressive refinement network 210 to generate a boundary uncertainty mask 322 based on alpha values of the first upsampled alpha matte 320. As used herein, the term boundary uncertainty mask refers to a segmentation mask (e.g., a binary segmentation mask indicating an uncertain region corresponding to a boundary of the foreground or background of an image). In particular embodiments, a boundary uncertainty mask can include a binary segmentation mask that selects portions of an alpha matte with values that do not definitively indicate foreground or background portions. For example, a boundary uncertainty mask includes portions of an alpha matte, such as boundary regions and/or areas of uncertainty that correspond to alpha values between an upper and lower bound. To illustrate, FIG. 3B depicts the progressive refinement network 210 generating the boundary uncertainty mask 322 as mainly comprising a selection of a hair region between the head/body of the foreground and the spatial region of the background.

In certain implementations, the progressive refinement network 210 generates the boundary uncertainty mask 322 according to the following example function:

$$f_{a_{l-1_{upsam}} \to g_l}(x, y) = \begin{cases} 1, & \text{if } 0 < \alpha_{l-1_{upsam}}(x, y) < 1 \\ 0, & \text{Otherwise} \end{cases}$$

In this example function, the term $\alpha_{l-1_{upsam}}$ represents the first upsampled alpha matte 320, the term $g_l$ represents the boundary uncertainty mask 322, and the term $\alpha_{l-1_{upsam}}(x,y)$ represents the alpha values of the first upsampled alpha matte 320. Thus, to generate the boundary uncertainty mask 322 according to this function, the progressive refinement network 210 selects (by representation of the value one "1" indicated in white color) the pixels associated with alpha values between zero and one. In addition, the progressive refinement network 210 deselects (by representation of the value zero "0" indicated in black color) all other pixels, such as the pixels associated with alpha values greater than or equal to one, or alpha values less than or equal to zero.

Further, the alpha matte generation system 106 utilizes the progressive refinement network 210 to generate a core alpha matte 324 based on the boundary uncertainty mask 322. As used herein, the term core alpha matte refers to an alpha matte that combines an alpha matte and a segmentation mask. In particular embodiments, a core alpha matte includes a previous layer alpha matte combined with a core certainty mask. For example, a core alpha matte includes the elementwise product or dot product of the previous layer alpha matte and the core certainty mask.

Relatedly, the term core certainty mask refers to a segmentation mask (e.g., a segmentation mask that reflects certain regions, or the core of, a background or foreground). In particular embodiments, a core certainty mask includes a binary segmentation mask that indicates more certain regions within an alpha matte (e.g., opposite that of the boundary uncertainty mask). For example, a core certainty mask may be defined as $1-g_l$, or the inverse of selected/deselected pixels in the boundary uncertainty mask. In other words, a core certainty mask may include a selection of pixels with corresponding alpha values that do not fall between a lower bound and an upper bound (e.g., less than or equal to the lower bound and greater than or equal to the upper bound).

To illustrate, the progressive refinement network 210 generates a core certainty mask 326 based on alpha values of the first upsampled alpha matte 320. In particular, the progressive refinement network 210 generates the core certainty mask 326 according to the function $1-g_l$, where $g_l$ represents the boundary uncertainty mask 322. Represented another way, the 210 generates the core certainty mask 326 according to the following function:

$$f_{core\_certainty\_mask}(x, y) = \begin{cases} 0, & \text{if } 0 < \alpha_{l-1_{upsam}}(x, y) < 1 \\ 1, & \text{Otherwise} \end{cases}$$

In this example function, the term $\alpha_{l-1_{upsam}}$ represents the first upsampled alpha matte 320, the term $f_{core\_certainty\_mask}$ represents the core certainty mask 326, and the term $\alpha_{l-1_{upsam}}(x,y)$ represents the alpha values of the first upsampled alpha matte 320. Thus, to generate the core certainty mask 326 according to this function, the progressive refinement network 210 deselects the pixels associated with alpha values between zero and one. In addition, the progressive refinement network 210 selects all other pixels, such as the pixels associated with alpha values greater than or equal to one, or alpha values less than or equal to zero. It will be appreciated that the progressive refinement network can utilize different upper and lower bounds (e.g., 0.2 and 0.8 instead of 0 and 1).

Additionally, as shown in FIG. 3B, the progressive refinement network 210 generates the core alpha matte 324 by processing the first upsampled alpha matte 320 and the core certainty mask 326. Specifically, the progressive refinement network 210 generates the core alpha matte 324 by determining the elementwise product of the first upsampled alpha matte 320 and the core certainty mask 326. In other embodiments, not illustrated, the progressive refinement network 210 can perform additional or alternative operations to combine the first upsampled alpha matte 320 and the core certainty mask 326 (e.g., scalar multiplication, averaging, etc.).

In one or more embodiments, the alpha matte generation system 106 uses the progressive refinement network 210 to generate the core alpha matte 324 as just described in order to delineate more certain or confident regions (e.g., foreground regions and/or background regions) in the first upsampled alpha matte 320. For example, the alpha matte generation system 106 can achieve better delineation of the foreground regions and the background regions in the first upsampled alpha matte 320 by applying higher-level features in the first upsampled alpha matte 320 to more certain core regions in the selection of the core certainty mask 326. For instance, in certain implementations, the alpha matte generation system 106 better preserves confidently-predicted regions from the first alpha matte 306 by applying the first upsampled alpha matte 320 with fewer or broader elements of detail in comparison to the second alpha matte 308. Thus, in some embodiments, the core alpha matte 324 comprises a more refined or delineated foreground and background region compared to the first upsampled alpha matte 320.

Similarly, FIG. 3B shows the alpha matte generation system 106 using the progressive refinement network 210 to generate a boundary alpha matte 328 based on the boundary uncertainty mask 322. As used herein, the term boundary alpha matte refers to an alpha matte that combines an alpha matte and a segmentation mask. In particular embodiments, a boundary alpha matte includes an alpha matte combined with a boundary uncertainty mask. For example, a boundary alpha matte includes the elementwise product or dot product of the current layer alpha matte and the boundary uncertainty mask.

To illustrate, the progressive refinement network 210 generates the boundary alpha matte 328 by processing the second alpha matte 308 from the second decoder layer 304b and the boundary uncertainty mask 322. In particular, the progressive refinement network 210 generates the boundary alpha matte 328 by determining the elementwise product of the second alpha matte 308 and the boundary uncertainty mask 322. Additionally or alternatively, the progressive refinement network 210 can perform other operations to combine the second alpha matte 308 and the boundary uncertainty mask 322 (e.g., scalar multiplication, averaging, etc.)

The alpha matte generation system 106 uses the progressive refinement network 210 to generate the boundary alpha matte 328 in order to delineate less certain regions in the second alpha matte 308. To illustrate, the alpha matte generation system 106 can achieve better delineation of a region of uncertainty by applying lower-level features in the second alpha matte 308 to the focused selection of the boundary uncertainty mask 322. For instance, in certain implementations, the progressive refinement network 210 leverages the specificity and detail of the second alpha matte 308 by applying additional and/or more granular detail in the second alpha matte 308 to the boundary uncertainty mask 322. Accordingly, in certain implementations, the boundary alpha matte 328 comprises a more refined or delineated region of uncertainty compared to the second alpha matte 308.

In addition, FIG. 3B shows the progressive refinement network 210 generating the refined alpha matte 312 by combining the core alpha matte 324 and the boundary alpha matte 328. Specifically, the progressive refinement network 210 generates the refined alpha matte 312 by performing elementwise summation of the core alpha matte 324 and the boundary alpha matte 328 (albeit additional or alternative operations may apply). Thus, as just described, the alpha matte generation system 106 uses the progressive refinement network 210 to generate the refined alpha matte 312 according to the following example function: $\alpha_l' = (\alpha_l \cdot g_l) + (\alpha_{l-1} \cdot [1 - g_l])$. In this example function, the term $(\alpha_l \cdot g_l)$ represents the boundary alpha matte 328 comprising the dot product of $\alpha_l$ (which represents the second alpha matte 308) and $g_l$ (which represents the boundary uncertainty mask 322). Further, the term $(\alpha_{l-1} \cdot [1 - g_l])$ represents the core alpha matte 324 comprising the dot product of $\alpha_{l-1}$ (which represents the first upsampled alpha matte 320) and $[1 - g_l]$ (which represents the core certainty mask 326). By combining the core alpha matte 324 and the boundary alpha matte 328, the progressive refinement network 210 generates the refined alpha matte 312 to better represent alpha values for the digital image.

Additionally, as mentioned above, the alpha matte generation system 106 can utilize the progressive refinement network 210 to perform multiple refinement iterations. For example, in a second refinement iteration, the alpha matte generation system 106 utilizes the progressive refinement network 210 to process the third alpha matte 314 from the third decoder layer 304c and the refined alpha matte 312 just described. In this second refinement iteration, the same or similar acts and algorithms described above again apply.

To illustrate, the progressive refinement network 210 upsamples the refined alpha matte 312 to match the resolution and pixel dimensions of the third alpha matte 314. Subsequently, as similarly described above, the progressive refinement network 210 generates an additional boundary uncertainty mask from alpha values of the refined alpha matte 312 (e.g., an upsampled version of the refined alpha matte 312). Based on the additional boundary uncertainty mask, the progressive refinement network 210 further generates an additional core alpha matte and an additional boundary alpha matte. For example, the progressive refinement network 210 generates the additional core alpha matte by combining the upsampled version of the refined alpha matte 312 with an additional core certainty mask (e.g., based on the additional boundary uncertainty mask as similarly discussed above). Still further, the progressive refinement network 210 generates the additional boundary alpha matte by combining the third alpha matte 314 from the third decoder layer 304c with the additional boundary uncertainty mask. Then, the progressive refinement network 210 generates the final alpha matte 316 by combining the additional core alpha matte and the additional boundary alpha matte.

In turn, the alpha matte generation system 106 can use the final alpha matte 316 to more accurately segregate foreground portions and background portions within the digital image 202. For example, the alpha matte generation system 106 can separate foreground pixels and background pixels in the digital image 202 in such a way as to realistically and accurately generate an enhanced digital image (e.g., that includes the foreground subject and associated details of fine hair strands against a different or more appealing backdrop).

In one or more alternative embodiments (not illustrated in FIGS. 3A-3B), the alpha matte generation system 106 does not include or implement the progressive refinement network 210. Instead, for example, the alpha matte generation system 106 uses deep supervision to modify and/or combine the various alpha mattes output from the matting neural network 206 (e.g., the first alpha matte 306, the second alpha matte 308, and the third alpha matte 314). In this example, the alpha matte generation system 106 includes one or more additional neural network layers trained with or independently of the matting neural network 206 to modify and/or combine alpha mattes in a manner that refines alpha mattes from the matting neural network 206.

Figure 4:
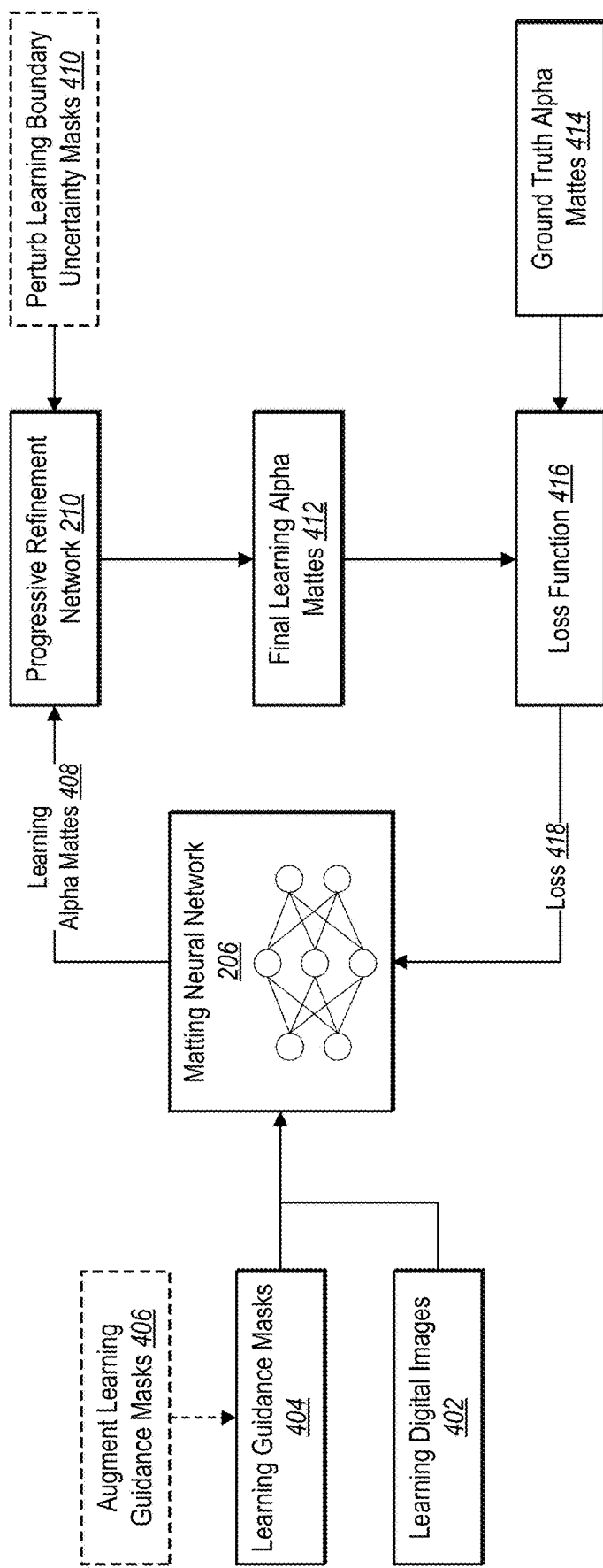
FIG. 4 illustrates an alpha matte generation system training a matting neural network with a progressive refinement network to generate alpha mattes in accordance with one or more embodiments.

As provided above, the alpha matte generation system 106 can use an alpha matting neural network and a progressive refinement network to efficiently and flexibly refine alpha mattes in an iterative process until achieving a final accurate alpha matte. FIG. 4 illustrates the alpha matte generation system 106 training the matting neural network 206 with the progressive refinement network 210 to generate alpha mattes with enhanced accuracy in accordance with one or more embodiments. As shown in FIG. 4, the learning process comprises processing learning inputs that include learning digital images 402 and learning guidance masks 404.

With reference to the learning process shown in FIG. 4, the terms train, learn, training or learning refer to one or more data elements or acts that can be utilized or performed for the purpose of tuning parameters to train a neural network. For example, guidance masks, digital images, and alpha mattes described above may include learning guidance masks, learning digital images, and learning alpha mattes in the context of training the matting neural network 206 as described below (or the foreground color prediction model described in relation to FIG. 5).

With respect to the learning digital images 402, the alpha matte generation system 106 utilizes one or more image datasets, such as the Composition-1k dataset that contains 431 foreground objects and corresponding ground truth alpha mattes for ground truth alpha mattes 414. Additionally or alternatively, the alpha matte generation system 106 utilizes other image datasets for the learning digital images 402, such as the Distinction-646 dataset (which provides more diversity than the Composition-1k dataset) and/or a real-world image dataset comprising diverse, high-resolution images with matting annotation by experts and subjects of diverse poses and positions.

For the learning guidance masks 404, the alpha matte generation system 106 either generates or obtains learning guidance masks corresponding to the learning digital images 402. For example, the alpha matte generation system 106 generates the learning guidance masks 404 by augmenting the ground truth alpha mattes 414 (e.g., as described below in relation to act 406). As another example, some of the image datasets used for the learning digital images 402 include corresponding guidance masks, such as trimaps. In other cases, the alpha matte generation system 106 generates the learning guidance masks 404. For instance, as similarly described above in relation to FIG. 3A, the alpha matte generation system 106 generates the learning guidance masks 404 by way of interactive user segmentation, labeling, etc. Otherwise, as also described above, the alpha matte generation system 106 can generate the learning guidance masks 404 by utilizing one or more guidance mask generation models that automatically or semi-automatically generate guidance masks.

For example, in certain implementations, the alpha matte generation system 106 uses a guidance mask generation model that generates trimaps for the learning guidance masks 404 by automatically segmenting the learning digital images 402 and labeling each pixel. Specifically, in one or more embodiments, the alpha matte generation system 106 uses the guidance mask generation model to label each pixel with foreground class probability greater than 95% as foreground, less than 5% as background, and the rest as unknown. In this example, the alpha matte generation system 106 further dilates the unknown region (e.g., k=20) to ensure long hairs are not missed. Still, in other implementations, the alpha matte generation system 106 uses different probability values (e.g., 50% for binary segmentation masks as the learning guidance masks 404).

Optionally, at act 406 in FIG. 4, the alpha matte generation system 106 augments the learning guidance masks 404 (e.g., to make the matting neural network 206 more robust and more flexibly adaptable to different guidance masks of various qualities). For example, as mentioned above, the alpha matte generation system 106 generates the learning guidance masks 404 by augmenting or perturbing the ground truth alpha mattes 414 to include augmentations (e.g., modifications, deletions, additions, etc.). Accordingly, in certain implementations of the act 406, the alpha matte generation system 106 binarizes the ground truth alpha mattes 414 with a random threshold uniformly sampled from zero to one. Additionally or alternatively, the alpha matte generation system 106 dilates and/or erodes each of the ground truth alpha mattes 414 in random order with random kernel sizes from one to thirty. Still, in other embodiments, the alpha matte generation system 106 applies other types of augmentations within the scope of the present disclosure.

As one example of an augmentation at the act 406, the alpha matte generation system 106 generates the learning guidance masks 404 by swapping identified portions of the ground truth alpha mattes 414. For example, the alpha matte generation system 106 identifies a first portion in a ground truth alpha matte and a second portion in the ground truth alpha matte. In turn, the alpha matte generation system 106 augments the ground truth alpha matte by moving the first portion and the second portion within the ground truth alpha matte.

To illustrate a particular implementation, the act 406 comprises the alpha matte generation system 106 swapping portions of ground truth alpha mattes by randomly selecting a patch (e.g., a group of pixels) depicting or representing digital content within a ground truth alpha matte. A patch size or amount of digital content (e.g., portions of a target object, foreground region, background region, or unknown region) included in a patch may range from about ¼ to about ½ of the image size of the ground truth alpha mattes 414.

In certain embodiments, the alpha matte generation system 106 swaps portions of ground truth alpha mattes by switching patch locations for a first patch and a second patch. Subsequently, the alpha matte generation system 106 overwrites original digital content at the patch locations with the digital content of the swapped patches. In at least some embodiments, this process is referred to as the CutMask process. Moreover, by perturbing ground truth alpha mattes in this manner, the alpha matte generation system 106 can achieve more localized guidance mask corruption to make the matting neural network 206 more robust to semantic noises in guidance masks during implementation.

Additionally or alternatively to augmenting the learning guidance masks 404, in certain implementations the alpha matte generation system 106 augments the learning digital images 402. For example, the alpha matte generation system 106 performs random compositing of foreground objects, random resizing with random interpolation methods, random affine transformation, color jitters, re-JEPGing, gaussian blur, gaussian noise, etc. As another example, the alpha matte generation system 106 removes transparent objects within the learning digital images 402. In yet another example, the alpha matte generation system 106 performs image cropping of patches of pixels (e.g., of 512×512 pixel blocks) centered on an unknown region for training. Subsequently, each patch is composited to a random background image (e.g., from the MS COCO dataset).

Additionally shown in FIG. 4, the alpha matte generation system 106 processes the learning digital images 402 and the learning guidance masks 404 to generate learning alpha mattes 408 (e.g., as similarly described above in relation to FIG. 3A). To do so, in certain implementations, the alpha matte generation system 106 uses one or more of the following example learning settings, parameters, and processes. A wide variety of settings, parameters, and processes (e.g., in myriad different possible combinations) may apply. Moreover, the alpha matte generation system 106 can adjust these settings, parameters, and processes to optimize training. For example, the alpha matte generation system 106 initializes the matting neural network 206 with ImageNet pre-trained weights. As additional examples of settings, parameters, and processes, the alpha matte generation system 106 uses a crop size of 512×512 pixels and four graphical processing units to process a batch size of 40 pairs of the learning digital images 402 and the learning guidance masks 404.

Further, in certain embodiments, the alpha matte generation system 106 utilizes particular batch processes to train the matting neural network 206 to predict alpha mattes at individual decoder layers. For example, the alpha matte generation system 106 trains the matting neural network 206 utilizing a first type of learning input for a first set of training iterations, a second type of learning input for a second set of training iterations, and a third type of learning input for a third set of training iterations.

In one particular example implementation, the alpha matte generation system 106 utilizes the following combinations of learning inputs at different sets of training iterations. For instance, the alpha matte generation system 106 guides the predictions at alpha prediction heads for strides (e.g., layers) 4 and 1 for the first 5,000 iterations using the learning guidance masks 404 generated from the ground truth alpha mattes 414. Then, for the next 10,000 iterations, the alpha matte generation system 106 guides the predictions at specific alpha prediction heads by utilizing the learning guidance masks 404 comprising evenly and randomly generated guidance masks from both self-prediction methods (e.g., guidance mask generation models) and perturbation methods that use the ground truth alpha mattes 414. After these initial iterations, each alpha prediction head may generate learning alpha mattes based on the learning guidance masks 404 solely from self-guidance methods (e.g., guidance mask generation models).

Further shown in FIG. 4, the alpha matte generation system 106 uses the progressive refinement network 210 to combine the learning alpha mattes 408 from different layers of the matting neural network 206 to ultimately generate final learning alpha mattes 412 (e.g., as described above in relation to FIGS. 3A-3B). For example, the progressive refinement network 210 generates learning core alpha mattes by combining a learning alpha matte from a previous layer of the matting neural network 206 with a learning core certainty mask (based on a learning boundary uncertainty mask). Additionally, for example, the progressive refinement network 210 generates a learning boundary alpha matte by combining a learning alpha matte from a current layer of the matting neural network 206 with the learning boundary uncertainty mask. Then, as described above, the alpha matte generation system 106 can generate a refined alpha matte by combining the learning core alpha matte and the learning boundary alpha matte. Moreover, by iterating this process, the alpha matte generation system 106 generates the final learning alpha mattes 412.

In some embodiments, the alpha matte generation system 106 adds additional robustness to the accuracy of the final learning alpha mattes 412 by perturbing one or more learning masks or learning alpha mattes within the progressive refinement network 210. For example, at act 410, the alpha matte generation system 106 perturbs learning boundary uncertainty masks. To illustrate, the alpha matte generation system 106 randomly dilates and/or erodes the learning boundary uncertainty masks generated by the progressive refinement network 210 to refine the learning alpha mattes 408. In certain implementations, the alpha matte generation system 106 dilates the learning boundary uncertainty masks corresponding to alpha mattes from stride 8 by the variable $K_1$ sampled from [1, 30]. Additionally or alternatively, the alpha matte generation system 106 dilates the learning boundary uncertainty masks corresponding to alpha mattes from stride 4 by the variable $K_2$ randomly sampled from [1, 15].

With the final learning alpha mattes 412 generated, the alpha matte generation system 106 utilizes a loss function 416 to compare the final learning alpha mattes 412 to the ground truth alpha mattes 414. In particular, by using the loss function 416 for the comparison, the alpha matte generation system 106 generates a loss 418 to use in updating one or more parameters of the matting neural network 206 (e.g., to narrow the difference between the final learning alpha mattes 412 and the ground truth alpha mattes 414 over subsequent training iterations). For example, in at least some embodiments, the alpha matte generation system 106 performs 100,000 iterations with warm-up at the first 5,000 iterations and cosine learning-rate decay. In some embodiments, the loss function 416 comprises an Adam optimizer with $\beta_1=0.5$ and $\beta_2=0.999$ and an initial learning rate of $1\times10^{-3}$. The alpha matte generation system 106 can utilize a variety of different loss functions.

In certain implementations, the loss function 416 comprises three particular loss components. One component comprises an $l_1$ regression loss, denoted as $L_{l_1}$ below. A second component comprises a composition loss (e.g., as described by Ning Xu, Brian Price, Scott Cohen, and Thomas Huang, *Deep Image Matting*, In CVPR, pp. 2970-2979, (2017), hereafter "Xu et al.," the contents of which are expressly incorporated herein by reference), denoted as $L_{comp}$. A third component comprises a Laplacian loss (e.g., as described by Qiqi Hou and Feng Liu, *Context-Aware Image Matting For Simultaneous Foreground And Alpha Estimation*, In ICCV, pp. 4130-4139, (2019), the contents of which are expressly incorporated herein by reference), denoted as $L_{lap}$. Accordingly, in certain implementations, the loss function 416 includes the summation of the components: $L(\hat{\alpha},\alpha)=L_{l_1}(\hat{\alpha},\alpha)+L_{comp}(\hat{\alpha},\alpha)+L_{lap}(\hat{\alpha},\alpha)$, where the term $\hat{\alpha}$ represents the ground truth alpha matte and the term $\alpha$ represents the prediction of the final learning alpha matte.

In at least some embodiments, the alpha matte generation system 106 generates the loss 418 based on the foregoing function and subsequently applies the loss 418 to each alpha prediction head of the matting neural network 206. Additionally or alternatively, the alpha matte generation system 106 modulates the loss 418 with pixel selection values (1 or 0) of a corresponding boundary uncertainty mask to focus the training on the unknown regions of an alpha matte. In this example, the final loss function as the loss function 416 is represented according to the following example expression: $L_{final} = \Sigma_l w_l L(\hat{\alpha} \cdot g_l, \alpha \cdot g_l)$, where the term $w_l$ represents the respective loss weights assigned to the different alpha prediction heads of the matting neural network 206 (e.g., $w_0$ for one alpha prediction head is 1, $w_1$ for a second alpha prediction head is 2, and $w_2$ for a third alpha prediction head is 3). Similarly, $g_l$ represents a corresponding boundary uncertainty mask corresponding to the output of a particular alpha prediction head. Additionally, for a first boundary uncertainty mask $g_0$, the alpha matte generation system 106 assigns all values to 1 so that the alpha matte from the first alpha prediction head can be supervised over the whole image to provide a more holistic semantic guidance for the alpha matte of the next alpha prediction head.

Alternatively, in certain implementations, the alpha matte generation system 106 removes one or more loss components described above. For example, the alpha matte generation system 106 may remove the composition loss from supervision because certain augmentations to the learning data can change the color of a composited learning image in the learning digital images 402. This change in color can void or otherwise render inapplicable the original color labels corresponding to the learning digital images 402.

After training the matting neural network 206 as just described in relation to FIG. 4, experimental test results have shown the alpha matte generation system 106 can provide increased performance levels relative to conventional systems. For example, the following tables provide test results indicating the alpha matte generation system 106 can better refine or enhance alpha mattes in comparison to conventional systems in view of various metrics, such as sum of absolution differences (SAD), mean squared error (MSE), Gradient (Grad), and Connectivity (Conn) errors according to official equations provided in Xu et al. incorporated by reference above.

To illustrate, Table 1 provided below indicates experimental results of conventional systems and an example embodiment of the alpha matte generation system 106 each processing the Composition-1k dataset to predict alpha mattes. As shown the example embodiment of the alpha matte generation system 106 provides an approximate 62%, 81%, 76%, and 65% average improvement for each of the metrics SAD, MSE, Grad, and Conn., respectively. To achieve these results, the example embodiment of the alpha matte generation system 106 utilized to settings: (i) TrimFG to adopt the confident foreground regions in a trimap as a coarse guidance mask and (ii) Trimap as a softmask type of guidance mask that normalizes trimaps to [0,1] with the unknown pixels being 0.5. In this manner, the results in Table 1 fairly compare to conventional systems that use trimap-based methods.

TABLE 1

Results on Composition-1k dataset

| Methods | SAD | MSE ($10^{-3}$) | Grad | Conn |
|---|---|---|---|---|
| Learning Based Matting | 113.9 | 48 | 91.6 | 122.2 |
| Closed-Form Matting | 168.1 | 91 | 126.9 | 167.9 |
| KNN Matting | 175.4 | 103 | 124.1 | 176.4 |
| Deep Image Matting | 50.4 | 14 | 31.0 | 50.8 |
| IndexNet Matting | 45.8 | 13 | 25.9 | 43.7 |
| AdaMatting | 41.7 | 10.2 | 16.9 | — |
| Context-Aware Matting | 35.8 | 8.2 | 17.3 | 33.2 |
| GCA Matting | 35.3 | 9.1 | 16.9 | 32.5 |
| Alpha Matte Generation System$_{TrimapFG}$ | 31.5 | 6.8 | 13.5 | 27.3 |
| Alpha Matte Generation System$_{Trimap}$ | 32.1 | 7.0 | 14.0 | 27.9 |

In addition, Table 2 provided below includes similar experimental results between conventional systems and an experimental embodiment of the alpha matte generation system 106, but with respect to the Distinction-646 dataset. Moreover, Table 2 shows the experimental embodiment of the alpha matte generation system 106 can be used as a refinement method to refine the alpha mattes of conventional systems. Indeed, by adding the alpha matte generation system 106 as a refinement process to each of the conventional systems shown in Table 2, the alpha matte generation system 106 experimentally improves each of the metrics SAD, MSE, Grad, and Conn. by an average of about 16%, 33%, 28%, and 20%, respectively. Specifically, in each row indicated for "+Alpha Matte Generation System," the alpha matte generation system 106 generated the experimental results by using a corresponding predicted alpha matte output from a conventional system as the input guidance mask.

TABLE 2

Results on Distinction-646 dataset

| Methods | SAD | MSE ($10^{-3}$) | Grad | Conn |
|---|---|---|---|---|
| Deep Image Matting + | 48.73 | 11.2 | 42.60 | 49.55 |
| Alpha Matte Generation System | 36.58 | 7.2 | 27.37 | 35.08 |
| IndexNet Matting + | 46.95 | 9.4 | 40.56 | 46.80 |
| Alpha Matte Generation System | 35.82 | 5.8 | 25.75 | 34.23 |
| Context-Aware Matting + | 36.32 | 7.1 | 29.49 | 35.43 |
| Alpha Matte Generation System | 35.04 | 5.4 | 24.55 | 33.35 |
| GCA Matting + | 39.64 | 8.2 | 32.16 | 38.77 |
| Alpha Matte Generation System | 35.93 | 5.7 | 25.94 | 34.35 |

With respect to Table 3, this table provides experimental results indicating the efficacy of the progressive refinement network 210 as well as the CutMask perturbation in training discussed above. Indeed, the alpha matte generation system 106 utilizing the progressive refinement network 210 (with and without the CutMask perturbation in training) experimentally provided an average improvement (over a version without the CutMask) in SAD and MSE of about 17% and 29%, respectively for the whole image, and about 14% and 26%, respectively for the unknown area. In these experiments, "Baseline" comprises a ResNet34-UNet architecture with Atrous Spatial Pyramid Pooling, "Deep Supervision" adds side outputs and deep supervision, and "Fusion Conv" uses convolutions to linearly combine alpha matte outputs.

Further, Table 3 provides additional results illustrating improvements achieved compared to linearly combining alpha matte outputs. That is, one or more implementations of the alpha matte generation system 106 can better coordinate the semantic refinement and low-level detail refinement at various different layers of the matting neural network 206 by utilizing the progressive refinement network 210 as disclosed in this application. In addition, the perturbations in the training processes described in this application can further improve both performance and robustness of the alpha matte generation system 106.

TABLE 3

Ablation studies on Composition-1k dataset with trimap guidance masks

| Methods | Whole Image | | Unknown Area | |
| --- | --- | --- | --- | --- |
| | SAD | MSE ($10^{-3}$) | SAD | MSE ($10^{-3}$) |
| Baseline | 43.7 | 4.5 | 39.8 | 11.2 |
| Baseline + Deep Supervision | 37.8 | 3.7 | 36.3 | 9.5 |
| Baseline + Fusion Conv | 38.1 | 3.2 | 36.9 | 8.8 |
| PRN w/o CutMask | 33.9 | 2.9 | 32.8 | 7.5 |
| PRN | 32.3 | 2.5 | 32.1 | 7.0 |

In another table below, Table 4 provides experimental results of conventional systems and an example implementation of the alpha matte generation system 106 processing a real-world portrait dataset. This image dataset comprises 637 diverse and high-resolution images with matting annotation made by experts. In addition, the images of this dataset comprise various image quality and subjects of diverse poses. At least some of the guidance masks corresponding to the images also comprise labels for the hair region and other soft tissues to indicate where the more important details of the image are located. Thus, by calculating errors in these regions, Table 4 reflects the potential efficacy and capability of an example implementation of the alpha matte generation system 106 to capture an object's boundary details in real-world scenarios relative to conventional systems. Indeed, Table 4 shows that the alpha matte generation system 106 experimentally provided an average improvement over conventional systems in SAD and MSE of about 49% and 45%, respectively for the whole image, and about 35% and 25%, respectively for the boundary details.

TABLE 4

Results on Real-World Portrait Dataset

| Methods | Whole Image | | Details | |
| --- | --- | --- | --- | --- |
| | SAD | MSE ($10^{-3}$) | SAD | MSE ($10^{-3}$) |
| Deep Image Matting | 28.5 | 11.7 | 19.1 | 74.6 |
| GCA Matting | 29.2 | 12.7 | 19.7 | 82.3 |
| IndexNet Matting | 28.5 | 11.5 | 18.8 | 72.7 |
| Context-Aware Matting | 27.4 | 10.7 | 18.2 | 66.2 |
| Late Fusion Matting | 78.6 | 39.8 | 24.2 | 88.3 |
| BSHM (low-res) | 10.7 | 15.5 | 7.60 | 91.0 |
| Alpha Matte Generation System | 26.8 | 9.3 | 17.4 | 55.1 |
| Alpha Matte Generation System (low-res) | 8.01 | 9.5 | 5.94 | 63.7 |

Figure 5:
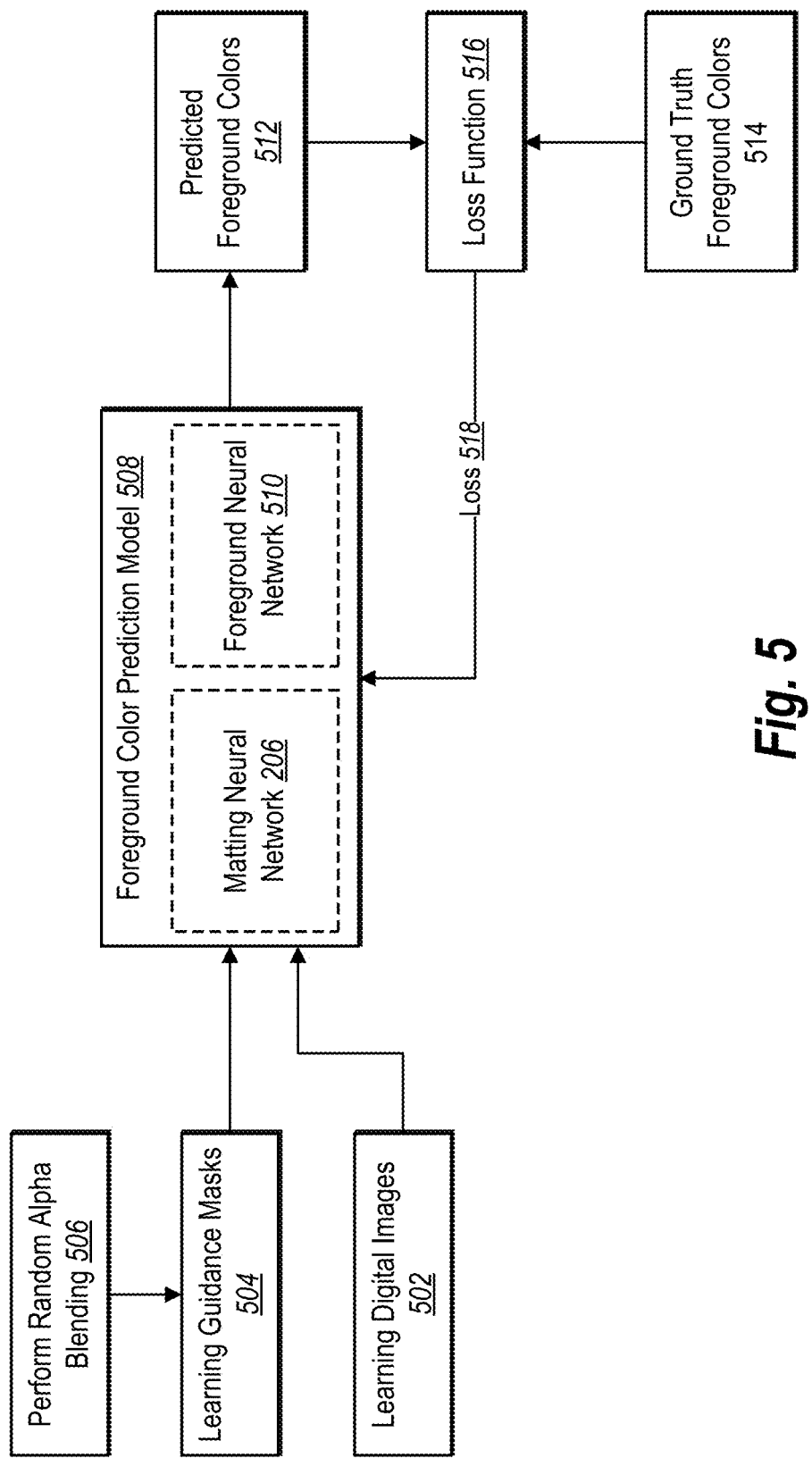
FIG. 5 illustrates an alpha matte generation system training a foreground color prediction model to generate predicted foreground colors in accordance with one or more embodiments.

As mentioned above, accurate image matting comprises multiple components that include alpha matte prediction as well as foreground color prediction. FIG. 5 illustrates the alpha matte generation system 106 learning a foreground color prediction model 508 to generate predicted foreground colors in accordance with one or more embodiments. Similar to FIG. 4, FIG. 5 shows that the learning process comprises processing learning inputs that include learning digital images 502 and learning guidance masks 504. In these or other embodiments, the learning digital images 502 and the learning guidance masks 504 are the same as (or similar to) the learning digital images 402 and the learning guidance masks 404 generated and/or utilized for learning the matting neural network 206. In particular embodiments, however, the learning guidance masks 504 comprise only alpha mattes.

As shown in FIG. 5, at an act 506 the alpha matte generation system 106 performs random alpha blending. As used herein, the term random alpha blending refers to using an arbitrary (or semi-arbitrary) alpha matte to blend a background portion and a foreground portion of a digital image. In particular, the alpha matte generation system 106 can use an alpha matte comprising one or more alpha values that are disassociated with a ground truth alpha matte. For example, the alpha matte generation system 106 assigns alpha values for blending a set of background and foreground portions in a particular learning digital image using a given random alpha matte for the particular learning digital image. As another example, the alpha matte generation system 106 generates alpha values for creating a pseudo-random alpha matte in accordance with a particular (e.g., non-random) algorithm, such as a Gaussian function, a random number generator, or a statistical model.

Accordingly, in certain implementations of the act 506, the alpha matte generation system 106 retrieves and/or generates a corresponding random alpha matte for each learning digital image comprising a set of background and foreground portions. Then, using the randomly selected alpha mattes, the alpha matte generation system 106 randomly ascribes corresponding alpha values to determine the blending amount or opacity levels between particular sets of background and foreground portions in the learning digital images 502.

There are several advantages to performing random alpha blending for generating synthetic versions of the learning guidance masks 504 that blend foreground images and background images using one or more randomly selected alpha mattes. For example, although the composited images in random alpha blending may not be semantically meaningful, the resulting alpha mattes used as the learning guidance masks 504 can provide accurate and unbiased foreground color labels in the transparent (boundary) region. Moreover, in certain cases, the random alpha blending imparts greater diversity to the learning inputs to the foreground color prediction model 508 for improving the generalization of foreground color prediction. In addition, the alpha matte generation system 106 can apply loss supervision over an entirety of a learning digital image. This type of loss supervision can lend to smoother foreground color prediction, which is particularly desired for robust compositing.

Additionally shown in FIG. 5, the alpha matte generation system 106 utilizes the foreground color prediction model 508 to process the learning digital images 502 and the learning guidance masks 504 to generate predicted foreground colors 512. As used herein, the term foreground color prediction model refers to a machine learning model that determines (or separates) foreground colors (from background colors) in a digital image. A color prediction model can include a variety of machine learning models that can be tuned (e.g., trained) based on inputs to approximate unknown functions. For instance, a foreground color prediction model can include one or more neural networks (as described above), or other machine learning models such as decision trees, support vector machines, etc. To illustrate, in certain implementations, a foreground color prediction model includes the matting neural network 206 (e.g., a neural network trained to predict foreground colors in addition to alpha values). In other implementations, a foreground color prediction model includes a foreground neural network (e.g., a neural network designated specifically for predicting foreground colors).

Relatedly, the term foreground color refers to color values of pixels corresponding to a foreground region in a digital image. For example, foreground color may include a plurality of red, green, and blue (RGB) color values for each pixel corresponding to a foreground region in a digital image. A single pixel of a digital image can include both foreground colors and background colors. A foreground color reflects the portion of a particular pixel that corresponds to the foreground (instead of the background).

As just described, in some embodiments, the foreground color prediction model 508 comprises only the matting neural network 206. In this embodiment, the alpha matte generation system 106 trains only a single model to perform both alpha matte prediction and foreground color prediction.

In one or more embodiments, the foreground color prediction model 508 comprises only a foreground neural network 510. In such embodiments, the alpha matte generation system 106 trains the foreground neural network 510 to predict foreground colors separately from training the matting neural network 206 to generate predicted alpha mattes. In this manner, the alpha matte generation system 106 can improve transferability of the foreground color prediction model 508 to use cases where the alpha matte is already provided because the foreground color prediction and alpha matte prediction are decoupled.

As further shown in FIG. 5, the foreground color prediction model 508 generates the predicted foreground colors 512 for comparison with ground truth foreground colors 514 utilizing a loss function 516. Specifically, as similarly described above, the alpha matte generation system 106 uses the loss function 516 to generate a loss 518 to use in updating one or more parameters of the foreground color prediction model 508 (e.g., to narrow the difference between the predicted foreground colors 512 and the ground truth foreground colors 514 over subsequent training iterations). Indeed, as mentioned in relation to FIG. 4, the loss function 516 likewise comprises the same summation of three loss components: an $l_1$ regression loss, a composition loss, and a Laplacian loss.

As mentioned above, utilizing the foregoing training approaches can provide a variety of advantages relative to conventional systems. For example, experimental test results have shown one or more example embodiments of the alpha matte generation system 106 can provide increased performance and robustness for generating the foreground result that combines predicted alpha matte values with predicted foreground colors (i.e., α·F). For example, as shown in Table 5 below, an example embodiment of the alpha matte generation system 106 experimentally provided an average improvement over conventional systems in SAD and MSE of about 76% and 92%, respectively.

TABLE 5

| Foreground Result on the Composition-1k dataset | | |
|---|---|---|
| Methods | SAD | MSE ($10^{-3}$) |
| Global Matting | 220.39 | 36.29 |
| Closed-Form Matting | 254.15 | 40.89 |
| KNN Matting | 281.92 | 36.29 |

TABLE 5-continued

| Foreground Result on the Composition-1k dataset | | |
|---|---|---|
| Methods | SAD | MSE ($10^{-3}$) |
| Context-Aware Matting | 61.72 | 3.24 |
| Alpha Matte Generation System | 49.80 | 2.48 |

Although not shown in Table 5, further experimental results indicated the effectiveness of performing random alpha blending during the learning process. To illustrate, an ablation study showed that a version of the alpha matte generation system 106 without performing random alpha blending achieved MSE and SAD scores of 0.0058 and 27.32, respectively for foreground color over foreground regions that comprise alpha values greater than zero. In contrast, the alpha matte generation system 106 with performing random alpha blending achieved MSE and SAD scores of 0.0037 and 25.46, respectively. Accordingly, in this study, the random alpha blending imparted an approximate 36% and 7% improvement in MSE and SAD scores, respectively.

Figure 6:
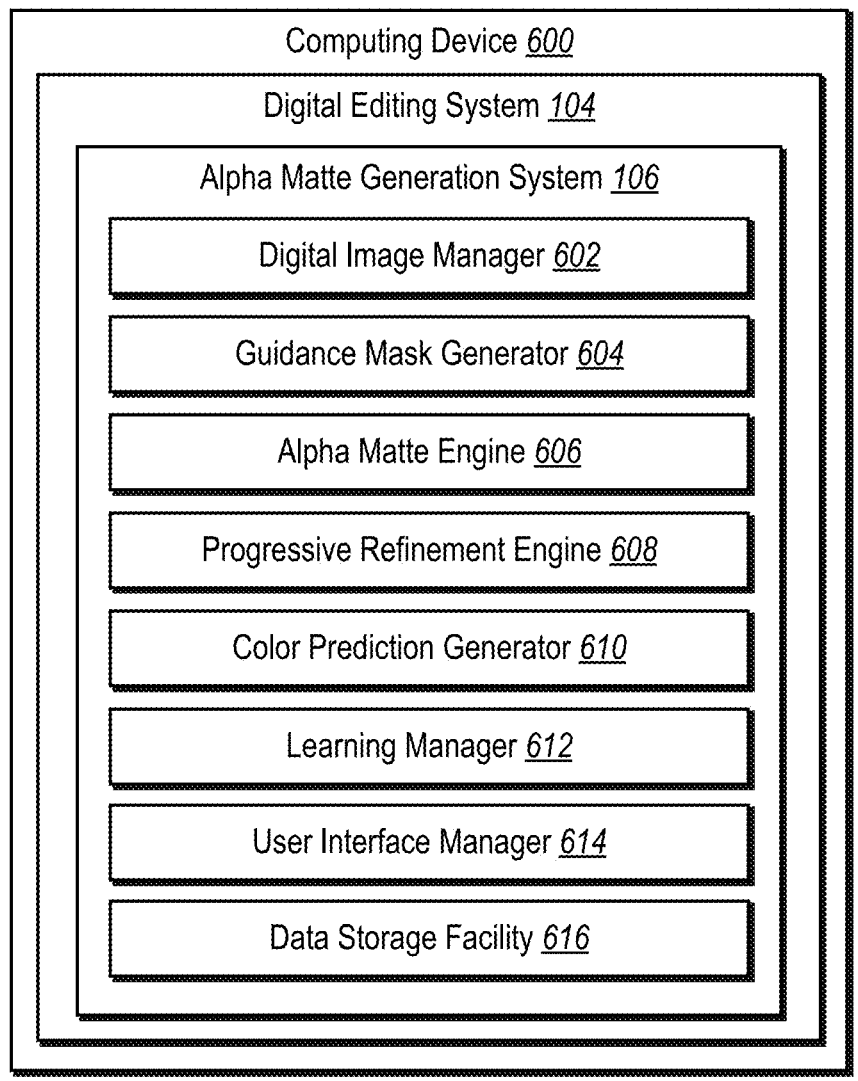
FIG. 6 illustrates an example schematic diagram of an alpha matte generation system in accordance with one or more embodiments.

Turning to FIG. 6, additional detail will now be provided regarding various components and capabilities of the alpha matte generation system 106. In particular, FIG. 6 illustrates an example schematic diagram of a computing device 600 (e.g., the server(s) 102 and/or the client device 108) implementing the alpha matte generation system 106 in accordance with one or more embodiments of the present disclosure. As shown, the alpha matte generation system 106 is further implemented by the server(s) 102 and the digital editing system 104. Also illustrated, the alpha matte generation system 106 can include a digital image manager 602, a guidance mask generator 604, an alpha matte engine 606, a progressive refinement engine 608, a color prediction generator 610, a learning manager 612, a user interface manager 614, and a data storage facility 616.

The digital image manager 602 can process, transmit, store, request, retrieve, and/or manage digital images (as described in relation to the foregoing figures). In particular embodiments, the digital image manager 602 transmits a digital image to the alpha matte engine 606 for processing with a corresponding guidance mask.

The guidance mask generator 604 can generate, retrieve, request, store, transmit and/or manage guidance masks (as described in relation to the foregoing figures). In particular embodiments, the guidance mask generator 604 utilizes interactive segmentation methods to generate a guidance mask. In other embodiments, the guidance mask generator 604 automatically generates the guidance mask. In addition, the alpha matte engine 606 transmits guidance masks to the alpha matte engine 606 for processing.

The alpha matte engine 606 can process a digital image and a guidance mask to generate predicted alpha mattes (as described in relation to the foregoing figures). In particular embodiments, the alpha matte engine 606 generates a set of different alpha mattes at different neural network layers. For example, the alpha matte engine 606 generates a first alpha matte in a first resolution utilizing a first alpha prediction head and a second alpha matte in a second (e.g., higher) resolution utilizing a second alpha prediction head.

The progressive refinement engine 608 can refine alpha mattes to generate a final alpha matte (as described in relation to the foregoing figures). In particular embodiments, the progressive refinement engine 608 combines alpha mattes from different neural network layers of the alpha matte engine 606. For example, the progressive refinement engine 608 combines alpha mattes to generate a final alpha matte by utilizing a boundary uncertainty mask to leverage lower-level details of higher resolution alpha mattes to refine a region of uncertainty.

The color prediction generator 610 can process, analyze, store, transmit, and/or predict foreground colors (as described in relation to the foregoing figures). In particular embodiments, the color prediction generator 610 predicts foreground colors to combine with alpha values of a predicted final alpha matte from the progressive refinement engine 608.

The learning manager 612 can manage learning processes for the alpha matte engine 606 and the color prediction generator 610 (as described in relation to the foregoing figures). In particular embodiments, the learning manager 612 performs perturbation operations on various learning data. For example, the learning manager 612 augments learning guidance masks for learning the alpha matte engine 606, perturbs boundary uncertainty masks generated by the progressive refinement engine 608, and/or performs random alpha blending for learning the color prediction generator 610.

The user interface manager 614 can provide, manage, and/or control a graphical user interface (or simply "user interface"). In particular, the user interface manager 614 may generate and display a user interface by way of a display screen composed of a plurality of graphical components, objects, and/or elements that allow a user to perform a function. For example, the user interface manager 614 can receive user inputs from a user, such as a click/tap to provide a digital image or generate a guidance mask. Additionally, the user interface manager 614 can present a variety of types of information, including segregated image objects, text, digital media items, or other information.

The data storage facility 616 maintains data for the alpha matte generation system 106. The data storage facility 616 (e.g., via one or more memory devices) can maintain data of any type, size, or kind, as necessary to perform the functions of the alpha matte generation system 106, including a matting neural network, digital images, guidance masks, learning data, etc.

Each of the components of the computing device 600 can include software, hardware, or both. For example, the components of the computing device 600 can include one or more instructions stored on a computer-readable storage medium and executable by processors of one or more computing devices, such as a client device or server device. When executed by the one or more processors, the computer-executable instructions of the alpha matte generation system 106 can cause the computing device(s) (e.g., the computing device 600) to perform the methods described herein. Alternatively, the components of the computing device 600 can include hardware, such as a special-purpose processing device to perform a certain function or group of functions. Alternatively, the components of the computing device 600 can include a combination of computer-executable instructions and hardware.

Furthermore, the components of the computing device 600 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 600 may be implemented as a stand-alone application, such as a desktop or mobile application. Furthermore, the components of the computing device 600 may be implemented as one or more web-based applications hosted on a remote server.

The components of the computing device 600 may also be implemented in a suite of mobile device applications or "apps." To illustrate, the components of the computing device 600 may be implemented in an application, including but not limited to ADOBE® PHOTOSHOP®, LIGHTROOM® or CREATIVE CLOUD® software. "ADOBE", "PHOTOSHOP," "LIGHTROOM," AND "CREATIVE CLOUD" are either registered trademarks or trademarks of Adobe Inc. in the United States and/or other countries.

Figure 7:
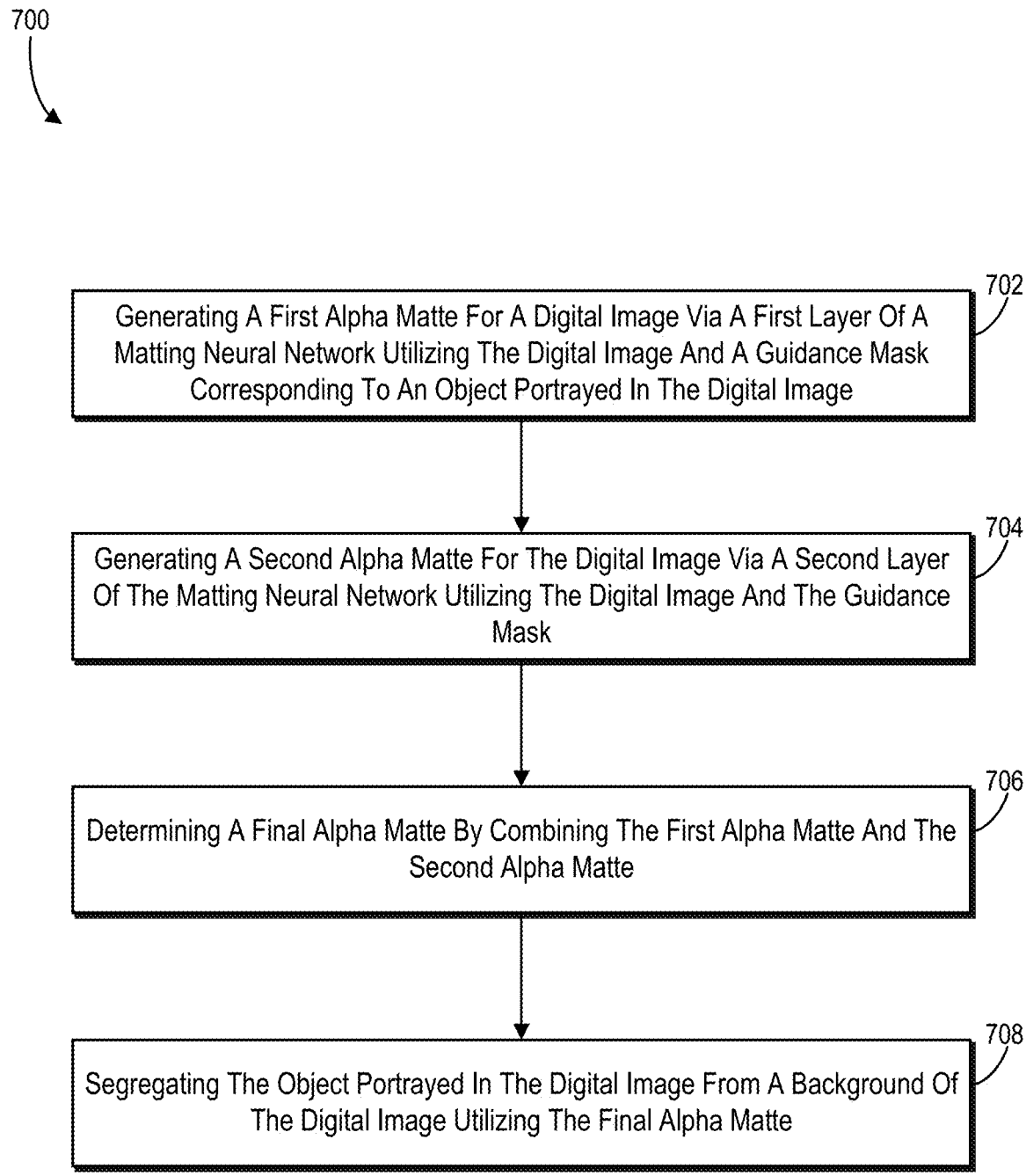
FIG. 7 illustrates a flowchart of a series of acts for segregating an object portrayed in a digital image utilizing a final alpha matte in accordance with one or more embodiments.

FIGS. 1-6, the corresponding text, and the examples provide several different systems, methods, techniques, components, and/or devices of the alpha matte generation system 106 in accordance with one or more embodiments. In addition to the above description, one or more embodiments can also be described in terms of flowcharts including acts for accomplishing a particular result. For example, FIG. 7 illustrates a flowchart of a series of acts 700 for segregating an object portrayed in a digital image utilizing a final alpha matte in accordance with one or more embodiments. The alpha matte generation system 106 may perform one or more acts of the series of acts 700 in addition to or alternatively to one or more acts described in conjunction with other figures. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown, the series of acts 700 includes an act 702 of generating a first alpha matte for a digital image via a first layer of a matting neural network utilizing the digital image and a guidance mask corresponding to an object portrayed in the digital image.

The series of acts 700 also includes an act 704 of generating a second alpha matte for the digital image via a second layer of the matting neural network utilizing the digital image and the guidance mask. In particular embodiments, the alpha matte generation system 106 generates the first alpha matte at a first resolution utilizing the first layer and the second alpha matte at a second resolution utilizing the second layer, the second resolution being greater than the first resolution.

In addition, the series of acts 700 includes an act 706 of determining a final alpha matte by combining the first alpha matte and the second alpha matte. In some embodiments, determining the final alpha matte comprises: generating a core certainty mask utilizing alpha values of the first alpha matte; generating a core alpha matte by processing the first alpha matte utilizing the core certainty mask; generating a boundary alpha matte by processing the second alpha matte utilizing the boundary uncertainty mask; and determining the final alpha matte utilizing the core alpha matte and the boundary alpha matte.

Additionally or alternatively, the act 706 to determine the final alpha matte can include generating a refined alpha matte by combining the first alpha matte and the second alpha matte, and generating the final alpha matte by combining the third alpha matte and the refined alpha matte.

The series of acts 700 further includes an act 708 of segregating the object portrayed in the digital image from a background of the digital image utilizing the final alpha matte.

It is understood that the outlined acts in the series of acts 700 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 7, act(s) in the series of acts 700 may include an act of combining the first alpha matte and the second alpha matte by upsampling the first alpha matte to the second resolution of the second alpha matte.

As another example act not shown in FIG. 7, act(s) in the series of acts 700 can include an act of: generating a boundary uncertainty mask utilizing alpha values of the first alpha matte; and determining the final alpha matte by processing the second alpha matte utilizing the boundary uncertainty mask and the first alpha matte.

In yet another example act not shown in FIG. 7, act(s) in the series of acts 700 can include an act of generating the core certainty mask by selecting portions of the first alpha matte with alpha values less than or equal to a lower bound and greater than or equal to an upper bound. Additionally or alternatively, act(s) in the series of acts 700 can include an act of generating the boundary uncertainty mask by selecting portions of the first alpha matte with alpha values between a lower bound and an upper bound.

In a further example act not shown in FIG. 7, act(s) in the series of acts 700 can include an act of: generating a third alpha matte via a third layer of the matting neural network utilizing the digital image and the guidance mask; and determining the final alpha matte by combining the first alpha matte, the second alpha matte, and third alpha matte.

Additionally or alternatively, act(s) in the series of acts 700 can include an act of receiving the guidance mask by receiving one of a binary segmentation mask, an alpha matte, or a trimap.

As another example act not shown in FIG. 7, act(s) in the series of acts 700 can include an act of: generating a first alpha matte at a first resolution via a first layer of the matting neural network by processing the digital image and the guidance mask; generating a second alpha matte at a second resolution via a second layer of the matting neural network by processing the digital image and the guidance mask, the second resolution being greater than the first resolution; determining a boundary uncertainty mask from alpha values of the first alpha matte; and generating a final alpha matte by combining the first alpha matte and the second alpha matte utilizing the boundary uncertainty mask.

In yet another example act not shown in FIG. 7, act(s) in the series of acts 700 can include an act of using a progressive refinement network to: generate a core certainty mask utilizing the alpha values of the first alpha matte; and generate a core alpha matte by processing the first alpha matte utilizing the core certainty mask. Additionally or alternatively, act(s) in the series of acts 700 can include an act of using the progressive refinement network to generate a boundary alpha matte by processing the second alpha matte utilizing the boundary uncertainty mask; and determine the final alpha matte utilizing the core alpha matte and the boundary alpha matte.

In still another example act not shown in FIG. 7, act(s) in the series of acts 700 can include an act of: generating a refined alpha matte by combining the first alpha matte and the second alpha matte utilizing a progressive refinement network; generating a third alpha matte via a third layer of the matting neural network utilizing the digital image and the guidance mask; determining an additional boundary uncertainty mask from alpha values of the refined alpha matte utilizing the progressive refinement network; and generating, using the progressive refinement network, the final alpha matte by combining the refined alpha matte and the third alpha matte utilizing the additional boundary uncertainty mask.

In another example act not shown in FIG. 7, act(s) in the series of acts 700 can include an act of: learn one or more parameters for the matting neural network by utilizing learning guidance masks that comprise augmentations to ground truth guidance masks, the augmentations comprising: selecting digital content in a first random patch from a first location to overwrite a second random patch at a second location; and selecting digital content in the second random patch from the second location to overwrite the first random patch at the first location.

In yet another example act not shown in FIG. 7, act(s) in the series of acts 700 can include an act of learning one or more parameters for the matting neural network by: generating learning alpha mattes from corresponding layers of the matting neural network; combining the learning alpha mattes to generate a final learning alpha matte utilizing a progressive refinement network that perturbs learning boundary uncertainty masks; comparing the final learning alpha matte and a ground truth alpha matte to determine a loss utilizing a loss function; and updating the one or more parameters of the matting neural network based on the loss.

As a further example act not shown in FIG. 7, act(s) in the series of acts 700 can include an act of learning one or more parameters for the matting neural network or a foreground neural network to predict foreground color by utilizing learning guidance masks that comprise random alpha blending between a foreground portion and a background portion.

In still another example act not shown in FIG. 7, act(s) in the series of acts 700 can include an act of generating predicted alpha mattes by utilizing a set of encoder layers and a set of decoder layers of the matting neural network with skip connections.

In addition (or in the alternative) to the acts described above, in some embodiments, the series of acts 700 can include performing a step for generating an alpha matte from the digital image and the guidance mask. For instance, the acts and algorithms described above in relation to FIGS. 3A-3B can comprise the corresponding acts (or structure) for performing a step for generating an alpha matte from the digital image and the guidance mask.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
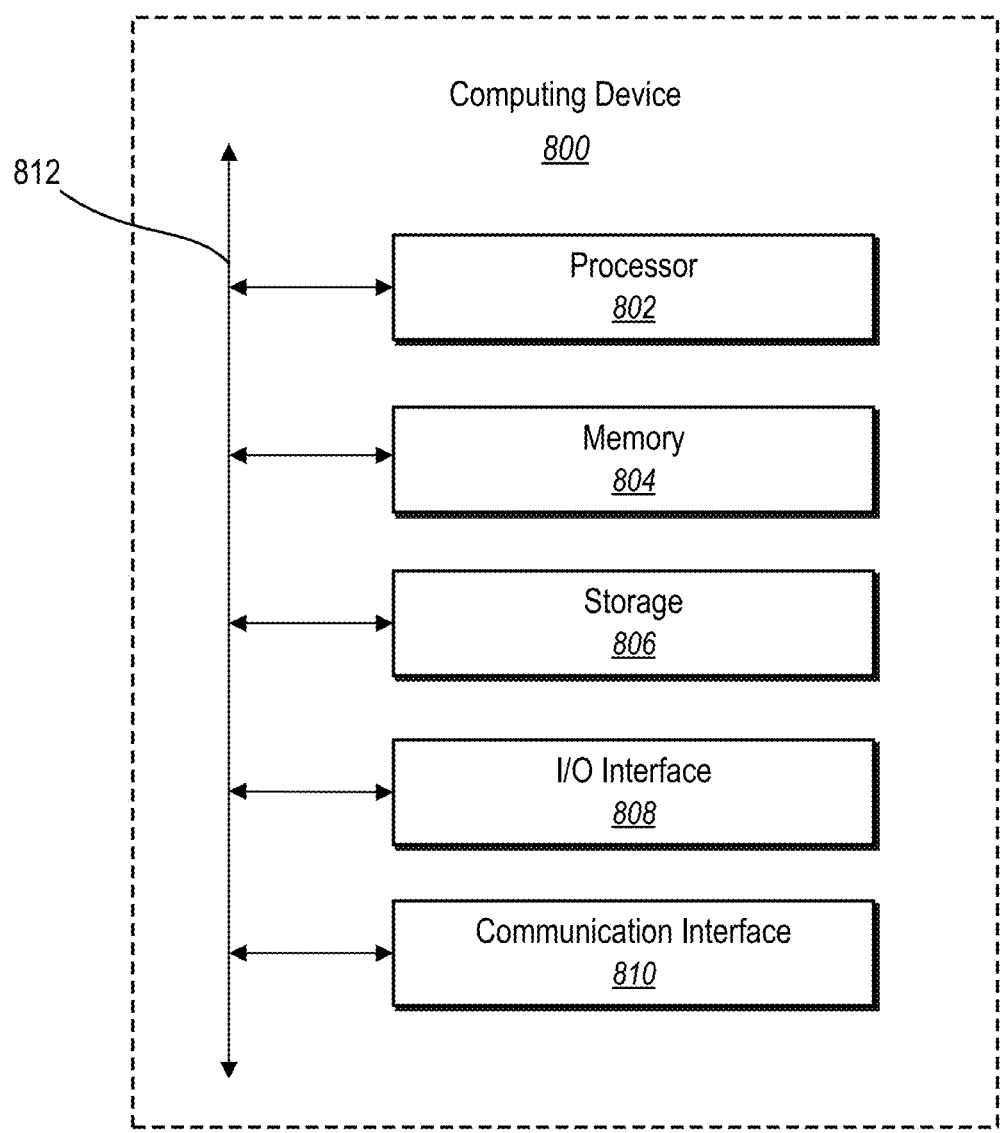
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 102, the client device 108, and/or the computing device 600). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
   generate a first alpha matte for a digital image via a first layer of a matting neural network utilizing the digital image and a guidance mask corresponding to an object portrayed in the digital image;
   generate a second alpha matte for the digital image via a second layer of the matting neural network utilizing the digital image and the guidance mask;
   determine a final alpha matte by combining the first alpha matte and the second alpha matte; and
   segregate the object portrayed in the digital image from a background of the digital image utilizing the final alpha matte.

2. The non-transitory computer-readable storage medium of claim 1, further comprising instructions that, when executed by the at least one processor, cause the computing device to generate the first alpha matte at a first resolution utilizing the first layer and the second alpha matte at a second resolution utilizing the second layer, the second resolution being greater than the first resolution.

3. The non-transitory computer-readable storage medium of claim 2, further comprising instructions that, when executed by the at least one processor, cause the computing device to combine the first alpha matte and the second alpha matte by upsampling the first alpha matte to the second resolution of the second alpha matte.

4. The non-transitory computer-readable storage medium of claim 1, further comprising instructions that, when executed by the at least one processor, cause the computing device to:
   generate a boundary uncertainty mask utilizing alpha values of the first alpha matte; and
   determine the final alpha matte by processing the second alpha matte utilizing the boundary uncertainty mask and the first alpha matte.

5. The non-transitory computer-readable storage medium of claim 4, further comprising instructions that, when executed by the at least one processor, cause the computing device to determine the final alpha matte by:
   generating a core certainty mask utilizing alpha values of the first alpha matte;
   generating a core alpha matte by processing the first alpha matte utilizing the core certainty mask;
   generating a boundary alpha matte by processing the second alpha matte utilizing the boundary uncertainty mask; and determining the final alpha matte utilizing the core alpha matte and the boundary alpha matte.

6. The non-transitory computer-readable storage medium of claim 5, further comprising instructions that, when executed by the at least one processor, cause the computing device to generate the core certainty mask by selecting portions of the first alpha matte with alpha values less than or equal to a lower bound and greater than or equal to an upper bound.

7. The non-transitory computer-readable storage medium of claim 4, further comprising instructions that, when executed by the at least one processor, cause the computing device to generate the boundary uncertainty mask by selecting portions of the first alpha matte with alpha values between a lower bound and an upper bound.

8. The non-transitory computer-readable storage medium of claim 1, further comprising instructions that, when executed by the at least one processor, cause the computing device to:
generate a third alpha matte via a third layer of the matting neural network utilizing the digital image and the guidance mask; and
determine the final alpha matte by combining the first alpha matte, the second alpha matte, and third alpha matte.

9. The non-transitory computer-readable storage medium of claim 8, further comprising instructions that, when executed by the at least one processor, cause the computing device to determine the final alpha matte by:
generating a refined alpha matte by combining the first alpha matte and the second alpha matte; and
generating the final alpha matte by combining the third alpha matte and the refined alpha matte.

10. The non-transitory computer-readable storage medium of claim 1, further comprising instructions that, when executed by at least one processor, cause a computing device to receive the guidance mask by receiving one of a binary segmentation mask, an alpha matte, or a trimap.

11. A system comprising:
one or more memory devices comprising a matting neural network, a digital image, and a guidance mask corresponding to an object portrayed in the digital image; and
one or more processors configured to cause the system to:
generate a first alpha matte at a first resolution via a first layer of the matting neural network by processing the digital image and the guidance mask;
generate a second alpha matte at a second resolution via a second layer of the matting neural network by processing the digital image and the guidance mask, the second resolution being greater than the first resolution;
determine a boundary uncertainty mask from alpha values of the first alpha matte; and
generate a final alpha matte by combining the first alpha matte and the second alpha matte utilizing the boundary uncertainty mask.

12. The system of claim 11, wherein the one or more processors are further configured to use a progressive refinement network to:
generate a core certainty mask utilizing the alpha values of the first alpha matte; and
generate a core alpha matte by processing the first alpha matte utilizing the core certainty mask.

13. The system of claim 12, wherein the one or more processors are further configured to use the progressive refinement network to:
generate a boundary alpha matte by processing the second alpha matte utilizing the boundary uncertainty mask; and
determine the final alpha matte utilizing the core alpha matte and the boundary alpha matte.

14. The system of claim 11, wherein the one or more processors are further configured to:
generate a refined alpha matte by combining the first alpha matte and the second alpha matte utilizing a progressive refinement network;
generate a third alpha matte via a third layer of the matting neural network utilizing the digital image and the guidance mask;
determine an additional boundary uncertainty mask from alpha values of the refined alpha matte utilizing the progressive refinement network; and
generate, using the progressive refinement network, the final alpha matte by combining the refined alpha matte and the third alpha matte utilizing the additional boundary uncertainty mask.

15. The system of claim 11, wherein the one or more processors are further configured to learn one or more parameters for the matting neural network by utilizing learning guidance masks that comprise augmentations to ground truth guidance masks, the augmentations comprising:
selecting digital content in a first random patch from a first location to overwrite a second random patch at a second location; and
selecting digital content in the second random patch from the second location to overwrite the first random patch at the first location.

16. The system of claim 11, wherein the one or more processors are further configured to learn one or more parameters for the matting neural network by:
generating learning alpha mattes from corresponding layers of the matting neural network;
combining the learning alpha mattes to generate a final learning alpha matte utilizing a progressive refinement network that perturbs learning boundary uncertainty masks;
comparing the final learning alpha matte and a ground truth alpha matte to determine a loss utilizing a loss function; and
updating the one or more parameters of the matting neural network based on the loss.

17. The system of claim 11, wherein the one or more processors are further configured to learn one or more parameters for the matting neural network or a foreground neural network to predict foreground color by utilizing learning guidance masks that comprise random alpha blending between a foreground portion and a background portion.

18. The system of claim 11, wherein the one or more processors are further configured to generate predicted alpha mattes by utilizing a set of encoder layers and a set of decoder layers of the matting neural network with skip connections.

19. A computer-implemented method comprising:
generating a first alpha matte for a digital image via a first layer of a matting neural network utilizing the digital image and a guidance mask corresponding to an object portrayed in the digital image;
generating a second alpha matte for the digital image via a second layer of the matting neural network utilizing the digital image and the guidance mask;
determining a final alpha matte by combining the first alpha matte and the second alpha matte; and segregating the object portrayed in the digital image from a background of the digital image utilizing the final alpha matte.

20. The computer-implemented method of claim 19, wherein receiving the guidance mask comprises receiving one of a binary segmentation mask, an alpha matte, or a trimap.

* * * * *